US 8,243,291 B2

(12) United States Patent
Kojima

(10) Patent No.: US 8,243,291 B2
(45) Date of Patent: Aug. 14, 2012

(54) IMAGE FORMING APPARATUS WITH CORRECTION DEVICE FOR DEFECT CORRECTION

(75) Inventor: Toshiya Kojima, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 1478 days.

(21) Appl. No.: 11/700,771

(22) Filed: Feb. 1, 2007

(65) Prior Publication Data
US 2007/0188821 A1 Aug. 16, 2007

(30) Foreign Application Priority Data
Feb. 3, 2006 (JP) .................. 2006-027618

(51) Int. Cl.
*G06F 3/12* (2006.01)
(52) U.S. Cl. ......... 358/1.1; 358/406; 347/103; 347/101; 347/74; 347/19; 347/1; 382/149
(58) Field of Classification Search ............. 347/103, 347/101, 1, 81, 78, 77, 74, 33, 29, 31, 22, 347/20, 19, 5; 358/406; 382/149
See application file for complete search history.

(56) References Cited

U.S. PATENT DOCUMENTS

| 6,094,502 A * | 7/2000 | Hirata et al. ............ 382/167 |
| 2005/0046658 A1 * | 3/2005 | Kojima .................... 347/19 |
| 2005/0099439 A1 | 5/2005 | Folkins |
| 2005/0110817 A1 | 5/2005 | Burke et al. |
| 2006/0066657 A1 * | 3/2006 | Folkins et al. ............. 347/19 |

FOREIGN PATENT DOCUMENTS

| JP | 2003-94615 A | 4/2003 |
| JP | 2005-145065 A | 6/2005 |
| JP | 2005-153521 A | 6/2005 |

OTHER PUBLICATIONS

Kimizuka J,Abnormality Detector for Electrostatic Recording Type Image Forming Device, May 31, 1996, JP 08137344 A.*

* cited by examiner

*Primary Examiner* — Benny Q Tieu
*Assistant Examiner* — Martin Mushambo
(74) *Attorney, Agent, or Firm* — Birch, Stewart, Kolasch & Birch, LLP

(57) ABSTRACT

The image forming apparatus includes: a recording head which has a plurality of recording elements; an intermediate transfer medium on which an image is recorded temporarily by the recording head while the intermediate transfer medium implements relative movement with respect to the recording head; an image defect determination device which is disposed on a downstream side of the recording head in terms of a direction of the relative movement of the intermediate transfer medium and which determines whether the image recorded on the intermediate transfer medium includes an image defect or not; a transfer device which is disposed on a downstream side of the image defect determination device in terms of the direction of the relative movement of the intermediate transfer medium and which transfers the image recorded on the intermediate transfer medium, to a recording medium; and an image correction device which creates correction data according to information about the image defect if the image defect determination device determines that the image recorded on the intermediate transfer medium includes the image defect, wherein, if the image defect determination device determines that the image recorded on the intermediate transfer medium includes the image defect, an image based on the correction data is recorded on the intermediate transfer medium by the recording head.

19 Claims, 20 Drawing Sheets

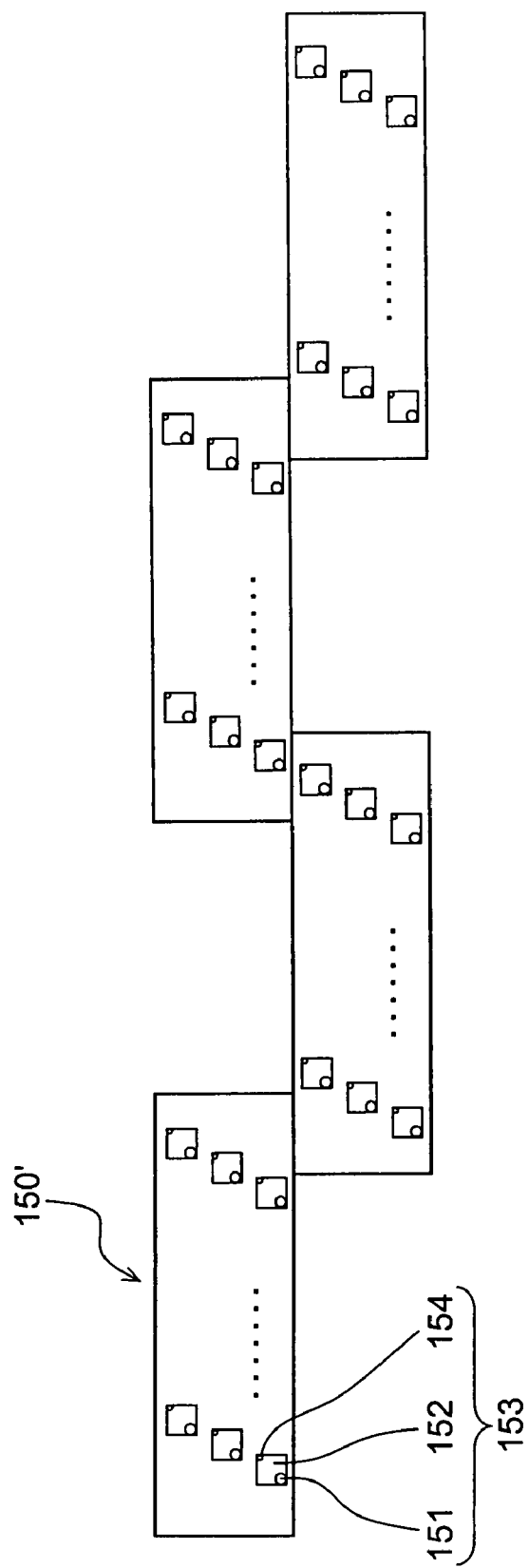

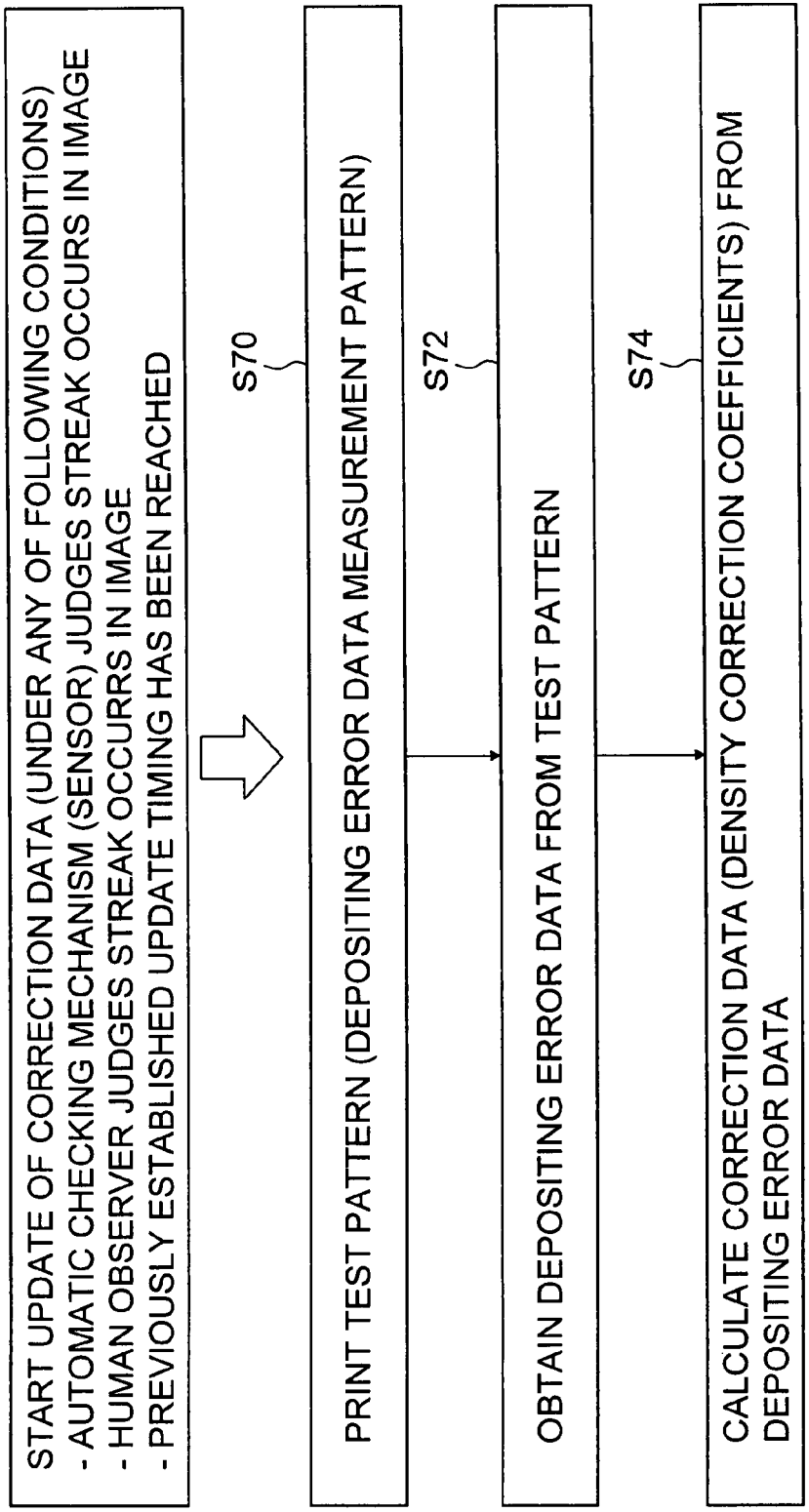

IMAGE FORMING APPARATUS WITH CORRECTION DEVICE FOR DEFECT CORRECTION

BACKGROUND OF THE INVENTION

1. Field of the Invention

The present invention relates to an image forming apparatus having an intermediate transfer medium, and more particularly, relates to an image forming apparatus which is capable of printing in a short period of time, without image quality defects and without wasteful use of paper and ink.

2. Description of the Related Art

As an image forming apparatus in the related art, an inkjet printer (inkjet recording apparatus) is known which comprises an inkjet printer head (liquid ejection head) having an arrangement of a plurality of liquid ejection nozzles and which records images on a recording medium by ejecting ink (liquid) from the nozzles toward the recording medium while causing the inkjet head and the recording medium to move relatively to each other.

Such an inkjet head of an inkjet printer of this kind has pressure generating units, each comprising, for example, a pressure chamber to which ink is supplied from an ink tank via an ink supply channel, a piezoelectric element which is driven by electrical signals in accordance with image data, a diaphragm which constitutes a portion of the pressure chamber and deforms in accordance with driving of the piezoelectric element, and a nozzle which is connected to the pressure chamber and from which the ink inside the pressure chamber is ejected in the form of a droplet because of the volume of the pressure chamber being reduced by the deformation of the diaphragm. In such an inkjet printer, an image is formed on a recording medium by combining dots formed by ink ejected from the nozzles of the pressure generating units.

It is difficult to remove the ink thus deposited on the recording medium, from the recording medium, and if there is a printing defect in an image recorded on the recording medium by an inkjet printer, it is difficult to perform a correction procedure and ultimately, a recording medium on which printing with defective image quality has been performed must be thrown away. This is undesirable from economical and environmental viewpoints.

Therefore, various methods have been proposed for reducing printing defects.

Japanese Patent Application Publication No. 2005-153521 discloses a method in which it is determined whether an ink ejection port has a failure or not (for example, whether an ink ejection port ejects a desired ink volume or not). If it is determined that the ink ejection port has a failure, then an ink ejection port that is adjacent to the defective ink ejection port and is normal is moved to a position corresponding to the ink ejection section suffering the failure, and additional image formation is then performed by the adjacent ink ejection port, thereby avoiding a printing defect.

Moreover, Japanese Patent Application Publication No. 2003-94615 discloses a method in which the location of the abnormality is identified in an image recorded on a print medium by determining a printing error, and relative movement of the print head is performed in order to carry out printing again.

As described above, various methods have been proposed in order to correct image defects due to nozzle failures, or the like. Both of the inventions described in Japanese Patent Application Publication No. 2005-153521 and Japanese Patent Application Publication No. 2003-94615, have the following correction function. More specifically, recording is once performed on a recording medium; image defects are then determined from the image information recorded onto the recording medium, and the like; the recording medium and the recording head are then moved relatively with respect to each other; and recording is then carried out again using a nozzle having a normal ejection state. Therefore, until the defective nozzles are restored to a normal ejection state by carrying out head maintenance with respect to the defective nozzles, it is necessary to carry out the correction procedure described above for each sheet repeatedly. Accordingly, the time required for printing is twice or more than the time period required for printing when nozzles used are in a normal ejection state. Consequently, printing onto the recording medium requires a large amount of time.

Since it is necessary to move the recording medium and the recording head relatively with respect to each other in such a manner that a nozzle in a normal ejection state reaches a position corresponding to a position suffering an image defect on the recording medium, then a function for achieving this movement must be added to the apparatus, and hence the apparatus becomes large in size and the manufacturing costs increase. Moreover, in cases where the image is not sufficiently corrected as the result even if correction processing of this kind is carried out, the image on the recording medium still suffers image defects, and hence such a recording medium needs to be thrown away eventually.

SUMMARY OF THE INVENTION

The present invention has been contrived in view of the foregoing circumstances, an object thereof being to provide a method and an apparatus in order that an image forming apparatus having a recording head, such as a liquid ejection head, can correct image defects in a short period of time, and can perform printing without giving rise to enlarged size of the apparatus and increased costs even if such image defects have occurred.

In order to attain the aforementioned object, the present invention is directed to an image forming apparatus comprising: a recording head which has a plurality of recording elements; an intermediate transfer medium on which an image is recorded temporarily by the recording head while the intermediate transfer medium implements relative movement with respect to the recording head; an image defect determination device which is disposed on a downstream side of the recording head in terms of a direction of the relative movement of the intermediate transfer medium and which determines whether the image recorded on the intermediate transfer medium includes an image defect or not; a transfer device which is disposed on a downstream side of the image defect determination device in terms of the direction of the relative movement of the intermediate transfer medium and which transfers the image recorded on the intermediate transfer medium, to a recording medium; and an image correction device which creates correction data according to information about the image defect if the image defect determination device determines that the image recorded on the intermediate transfer medium includes the image defect, wherein, if the image defect determination device determines that the image recorded on the intermediate transfer medium includes the image defect, an image based on the correction data is recorded on the intermediate transfer medium by the recording head.

According to this aspect of the present invention, it is possible to print an image by making good use of an image defect, and hence printing costs can be reduced.

Preferably, the intermediate transfer medium is separated from the transfer device if the image defect determination device determines that the image recorded on the intermediate transfer medium includes the image defect.

According to this aspect of the present invention, it is possible to move the intermediate transfer medium to the printing area, without transferring a deteriorated image to the transfer device. Hence, the step of removing ink contaminations on the transfer device can be omitted and improved quality can be achieved.

Preferably, the image forming apparatus further comprises an ink cleaning device which is disposed on an upstream side of the recording head in terms of the direction of the relative movement of the intermediate transfer medium.

According to this aspect of the present invention, it is possible to reduce wastefull use of ink, and the image correction can be carried out readily and inexpensively.

In order to attain the aforementioned object, the present invention is also directed to an image forming apparatus comprising: a recording head which has a plurality of recording elements; an intermediate transfer medium on which an image is recorded temporarily by the recording head while the intermediate transfer medium implements relative movement with respect to the recording head; an image defect determination device which is disposed on a downstream side of the recording head in terms of a direction of the relative movement of the intermediate transfer medium and which determines whether the image recorded on the intermediate transfer medium includes an image defect or not; an ink cleaning device which is disposed on a downstream side of the image defect determination device in terms of the direction of the relative movement of the intermediate transfer medium and which removes ink deposited on the intermediate transfer medium by the recording head; a transfer device which is disposed on a downstream side of the ink cleaning device in terms of the direction of the relative movement of the intermediate transfer medium and which transfers the image recorded on the intermediate transfer medium, to a recording medium; and an image correction device which creates correction data according to information about the image defect if the image defect determination device determines that the image recorded on the intermediate transfer medium includes the image defect, wherein, if the image defect determination device determines that the image recorded on the intermediate transfer medium includes the image defect, then the ink deposited on the intermediate transfer medium by the recording head is removed by the ink cleaning device and an image based on the correction data is recorded on the intermediate transfer medium by the recording head.

According to this aspect of the invention, it is possible to achieve further reliable image correction.

In order to attain the aforementioned object, the present invention is also directed to an image forming apparatus comprising: a recording head which has a plurality of recording elements; an intermediate transfer medium on which an image is recorded temporarily by the recording head while the intermediate transfer medium implements relative movement with respect to the recording head; an image defect determination device which is disposed on a downstream side of the recording head in terms of a direction of the relative movement of the intermediate transfer medium and which determines whether the image recorded on the intermediate transfer medium includes an image defect or not; a transfer device which is disposed on a downstream side of the image defect determination device in terms of the direction of the relative movement of the intermediate transfer medium and which transfers the image recorded on the intermediate transfer medium, to a recording medium; an ink cleaning device which is disposed on a downstream side of the transfer device and on an upstream side of the recording head in terms of the direction of the relative movement of the intermediate transfer medium and which removes ink deposited on the intermediate transfer medium by the recording head; and an image correction device which creates correction data according to information about the image defect if the image defect determination device determines that the image recorded on the intermediate transfer medium includes the image defect, wherein, if the image defect determination device determines that the image recorded on the intermediate transfer medium includes the image defect, then the transfer device is separated from the intermediate transfer medium, the ink deposited on the intermediate transfer medium by the recording head is removed by the ink cleaning device, and an image based on the correction data is recorded on the intermediate transfer medium by the recording head.

According to this aspect of the present invention, it is possible to achieve further reliable image correction.

In order to attain the aforementioned object, the present invention is also directed to an image forming apparatus comprising: a recording head which has a plurality of recording elements; an intermediate transfer medium on which an image is recorded temporarily by the recording head while the intermediate transfer medium implements relative movement with respect to the recording head; an image defect determination device which is disposed on a downstream side of the recording head in terms of a direction of the relative movement of the intermediate transfer medium and which determines whether the image recorded on the intermediate transfer medium includes an image defect or not; an ink cleaning device which is disposed on a downstream side of the image defect determination device in terms of the direction of the relative movement of the intermediate transfer medium and which removes ink deposited on the intermediate transfer medium by the recording head; a transfer device which is disposed on a downstream side of the ink cleaning device in terms of the direction of the relative movement of the intermediate transfer medium and which transfers the image recorded on the intermediate transfer medium, to a recording medium; and an image correction device which creates correction data according to information about the image defect if the image defect determination device determines that the image recorded on the intermediate transfer medium includes the image defect, wherein: a test pattern image is recorded on the intermediate transfer medium by the recording head, the image defect determination device determines whether the test pattern image recorded on the intermediate transfer medium includes an image defect or not, and the ink cleaning device removes ink deposited on the intermediate transfer medium after the image defect determination device determines whether the test pattern image recorded on the intermediate transfer medium includes the image defect or not; and if the image defect determination device determines that the test pattern image recorded on the intermediate transfer medium includes the image defect, then the image correction device creates correction data according to information about the image defect included in the test pattern image and an image based on the correction data is recorded on the intermediate transfer medium by the recording head.

By checking for image quality according to a test pattern image, then it is possible to obtain a desired image quality readily.

In order to attain the aforementioned object, the present invention is also directed to an image forming apparatus comprising: a recording head which has a plurality of recording elements; an intermediate transfer medium on which an image is recorded temporarily by the recording head while the intermediate transfer medium implements relative movement with respect to the recording head; an image defect determination device which is disposed on a downstream side of the recording head in terms of a direction of the relative movement of the intermediate transfer medium and which determines whether the image recorded on the intermediate transfer medium includes an image defect or not; a transfer device which is disposed on a downstream side of the image defect determination device in terms of the direction of the relative movement of the intermediate transfer medium and which transfers the image recorded on the intermediate transfer medium, to a recording medium; an ink cleaning device which is disposed on a downstream side of the transfer device and on an upstream side of the recording head in terms of the direction of the relative movement of the intermediate transfer medium and which removes ink deposited on the intermediate transfer medium by the recording head; and an image correction device which creates correction data according to information about the image defect if the image defect determination device determines that the image recorded on the intermediate transfer medium includes the image defect, wherein: a test pattern image is recorded on the intermediate transfer medium by the recording head, the image defect determination device determines whether the test pattern image recorded on the intermediate transfer medium includes an image defect or not, and the transfer device is separated from the intermediate transfer medium and the ink cleaning device removes ink deposited on the intermediate transfer medium after the image defect determination device determines whether the test pattern image recorded on the intermediate transfer medium includes the image defect or not; and if the image defect determination device determines that the test pattern image recorded on the intermediate transfer medium includes the image defect, then the image correction device creates correction data according to information about the image defect included in the test pattern image and an image based on the correction data is recorded on the intermediate transfer medium by the recording head.

By checking for image quality according to a test pattern image, then it is possible to obtain a desired image quality readily.

Preferably, maintenance of the recording head is not carried out until printing according to a print instruction information received by the image forming apparatus is completed.

Preferably, the image correction device comprises: a correction range setting unit which selects N correction recording elements (where N is an integer which is 2 or more) used for correcting output density, from the plurality of recording elements; a correction coefficient setting unit which sets density correction coefficients for the N correction recording elements according to correction conditions including a condition under which a power spectrum representing spatial frequency characteristics of a density non-uniformity due to recording characteristics of the plurality of recording elements has a differential coefficient of substantially zero at a frequency origin point (f=0); and a correction processing unit which performs calculation for correcting the output density according to the density correction coefficients set by the correction coefficient setting unit.

Generally, density non-uniformity of a recorded image (density non-uniformities) can be represented by the intensity of the spatial frequency characteristics (power spectrum), and the visibility of density non-uniformity can be evaluated by means of the low-frequency components of the power spectrum, since human vision has high sensitivity to low-frequency components and this sensitivity declines as the frequency increases. According to this aspect of the present invention, since the density correction coefficients are specified by using conditions under which the differential coefficient at the frequency origin point (f=0) of the power spectrum after correction using the density correction coefficients become substantially zero, then the intensity of the power spectrum becomes a minimum at the frequency origin point and the power spectrum restricted to a low value in the vicinity of the origin (in other words, in the low-frequency region). Accordingly, highly accurate correction of non-uniformity can be achieved.

The "characteristics information acquisition device" may acquire information by storing information about the recording characteristics of the recording elements, previously, in a storage device such as a memory, and then reading out the required information; and it may acquire information about the recording characteristics by printing a test pattern, or the like, actually, and then reading in and analyzing the print results of the test pattern, or the like.

Considering that the recording characteristics change over time, a desirable mode is one in which the information is updated at suitable times.

An inkjet recording apparatus according to one mode of the image recording apparatus of the present invention comprises: a liquid ejection head (corresponding to a "recording head") having a droplet ejection element row in which a plurality of liquid droplet ejection elements (corresponding to "recording elements") are arranged in a row, each droplet ejection element including a nozzle for ejecting an ink droplet in order to form a dot and a pressure generating device (piezoelectric element, heating element, or the like) which generates an ejection pressure; and an ejection control device which controls the ejection of droplets from the recording head on the basis of ink ejection data generated from the image data. An image is formed on the intermediate transfer medium by means of droplets ejected from the nozzles, and the image thus formed is transferred onto a recording medium.

As a compositional embodiment of the recording head, a full line type head is taken which includes a recording element row in which a plurality of recording elements (nozzles) are arranged through a length corresponding to the full width of the intermediate transfer medium. In this case, a mode may be adopted in which a plurality of relatively short recording head modules having recording element rows which do not reach a length corresponding to the full width of the intermediate transfer medium are combined and joined together, thereby forming recording element rows of a length that corresponds to the full width of the intermediate transfer medium.

A full line type head is usually disposed in a direction that is perpendicular to the relative feed direction (relative conveyance direction) of a recording medium, but a mode may also be adopted in which the recording head is disposed following an oblique direction that forms a prescribed angle with respect to the direction perpendicular to the conveyance direction.

The "recording medium" indicates a medium on which an image is recorded by means of the action of the recording head (this medium may also be called an image forming medium, print medium, image receiving medium, or, in the case of an inkjet recording apparatus, an ejection medium or ejection receiving medium, or the like). This term includes various types of media, irrespective of material and size, such as continuous paper, cut paper, sealed paper, resin sheets such as OHP sheets, film, cloth, an intermediate transfer medium, a printed circuit board on which a wiring pattern is printed by means of an inkjet recording apparatus, and the like.

The "conveyance device" may include a mode where a recording medium is conveyed with respect to a stationary (fixed) recording head, a mode where a recording head is moved with respect to a stationary (fixed) recording medium, and a mode where both the recording head and the intermediate transfer medium are moved.

In order to form color images by means of an inkjet head, it is possible to provide recording heads for inks of a plurality of colors (recording liquids), or it is possible to eject inks of a plurality of colors from a single recording head.

Furthermore, the present invention is not limited to the above-described types of full line head, and may also be applied to a serial (shuttle) scanning type recording head (a recording head which ejects droplets while moving reciprocally in a direction substantially perpendicular to the conveyance direction of a recording medium).

As described above, according to the present invention, beneficial effects are obtained in that it is possible to correct an image defect caused by a nozzle defect, or the like, without giving rise to increase in the size of the apparatus and to increase in costs, and in that it is possible to print an image without quality defects in a short period of time.

Furthermore, by using an intermediate transfer medium, even if an image defect is detected, it is possible to transfer only a correct image. Therefore, printing can be carried out at high speed without wasteful use of paper.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 4 is a plan view perspective diagram showing another structural embodiment of a full line type of head;

FIG. 20 is a flowchart showing a sequence of processing for updating the correction data.

DETAILED DESCRIPTION OF THE PREFERRED EMBODIMENTS

Figure 1:
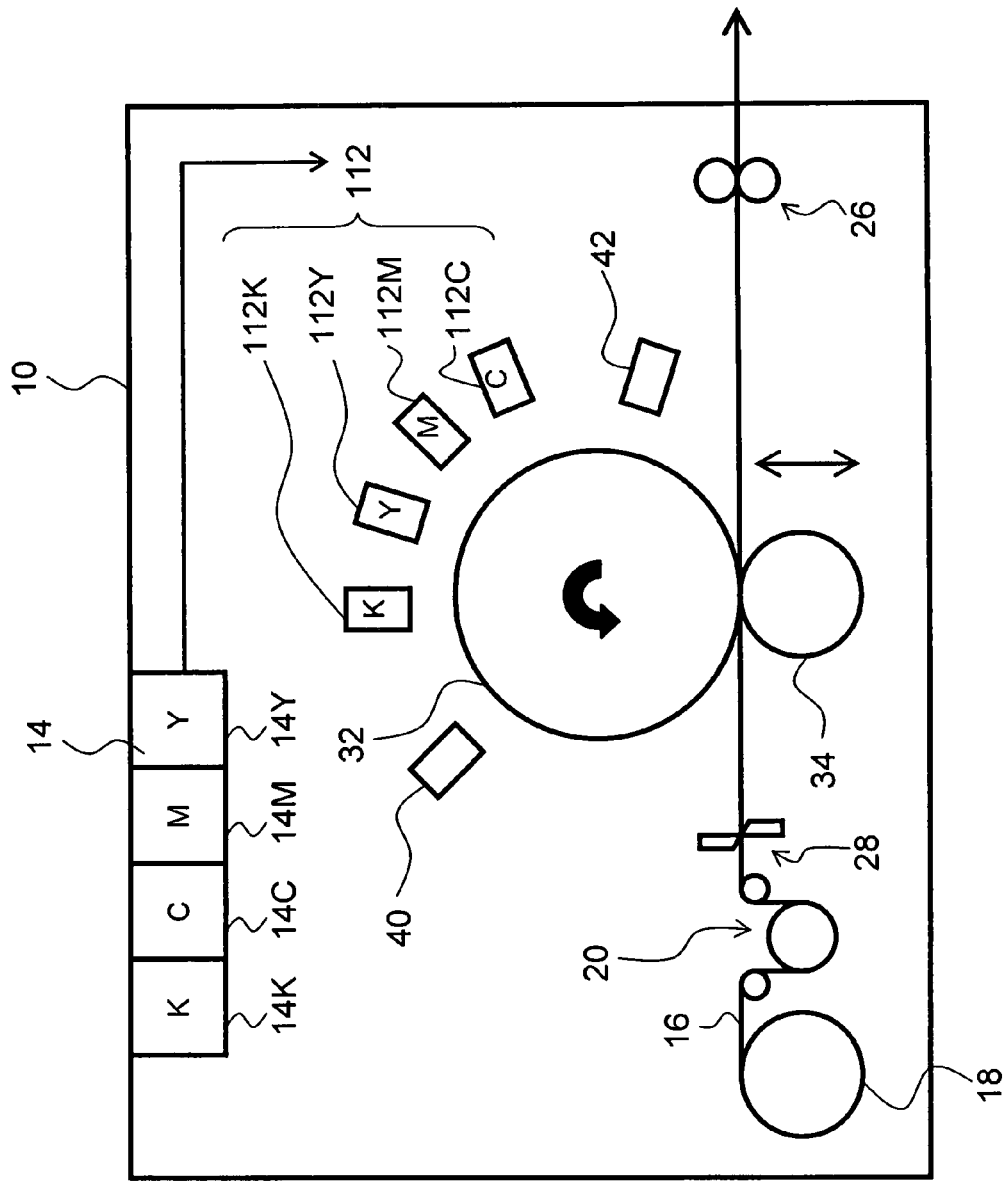
FIG. 1 is a general schematic view showing an inkjet recording apparatus which forms an image recording apparatus according to a first embodiment of the present invention.

FIG. 1 is a general schematic drawing of an inkjet recording apparatus which forms an image recording apparatus according to a first embodiment of the present invention.

As shown in FIG. 1, the inkjet recording apparatus 10 comprises: a plurality of recording heads (liquid ejection heads) 112 (112C, 112M, 112Y and 112K) which eject droplets of liquid or ink and are respectively provided for ink colors of cyan (C), magenta (M), yellow (Y) and black (K); an ink storing and loading unit 14 which has ink tanks 14C, 14M, 14Y and 14K for storing inks of C, M, Y and K to be supplied to the heads 112C, 112M, 112Y and 112K; an intermediate transfer medium (which is also referred to as an "intermediate transfer drum") 32 which has a surface on which an image is temporarily recorded; a paper supply unit 18 which supplies recording paper 16 onto which an image is recorded by transferring the image having been temporarily recorded on the intermediate transfer medium 32; and a paper output unit 26 which outputs the recording paper 16 after recording.

As shown in FIG. 1, the recording heads 112 (112C, 112M, 112Y and 112K) corresponding to the inks of the colors are disposed in the sequence, cyan (C), magenta (M), yellow (Y) and black (K), from the upstream side, following the direction of rotation of the intermediate transfer medium 32 (the direction indicated by an arrow shown in FIG. 1).

By ejecting inks of the colors from the recording heads 112 (112C, 112M, 112Y and 112K) respectively while the intermediate transfer medium 32 is made to rotate, an image is temporarily formed on the surface of the intermediate transfer medium 32.

The recording heads 112 (112C, 112M, 112Y and 112K) are supplied with liquids (hereinafter referred also simply to as "ink") containing coloring material (dye or pigment), respectively.

A magazine for rolled paper (a container in which rolled paper is loaded) may be used as an embodiment of the paper supply unit 18, and a plurality of magazines with papers of different paper width and quality may be jointly provided. Moreover, paper may also be supplied from cassettes which contain cut papers loaded in layers and which are used jointly or in lieu of magazines for rolled papers.

In the present embodiment, a transfer image is formed firstly on the intermediate transfer medium 32, solvent in the ink deposited on the intermediate transfer medium is then removed, and the transfer image is then transferred onto the recording paper 16. Hence, the image quality is less subject to the effects of permeation of ink into the recording paper, and therefore it is possible to use various types of recording paper 16 and thus the freedom of choice of the recording paper 16 to be used is increased. Moreover, the intermediate transfer medium 32 includes very fine liquid-repelling sections and non-liquid-repelling sections. The non-liquid-repelling sections are permeable with respect to the ink solvent, and hence the occurrence of bleeding or stickiness on the recording medium can be reduced by absorbing the liquid from the inner side of the intermediate transfer medium 32.

The recording paper 16 delivered from the paper supply unit 18 may retain curl due to having been loaded in the magazine in the form of rolled paper. In order to remove this curl, a decurling unit 20 is located posterior to the paper supply unit 18. The decurling unit 20 applies heat to the recording paper 16, by means of a heating drum, in the direction opposite to the direction of the curl induced in the magazine. In this process, the heating temperature is preferably controlled in such a manner that the medium has a curl where the surface on which the print is to be made is slightly rounded in the outward direction.

In a case in which roll paper is used, a cutter 28 is located posterior to the decurling unit 20 as shown in FIG. 1, and the roll paper is cut to a desired size by the cutter 28. The cut recording paper 16 is conveyed with the print surface facing upwards in the diagram, and the transfer image formed on the intermediate transfer medium 32 is transferred when the recording paper 16 is pinched between the intermediate transfer medium 32 and a transfer roller 34 (corresponding to a "transfer device"). When cut paper is used, the cutter 28 is not required.

The transfer roller 34, an ink cleaning device 42, the recording heads 112 (112C, 112M, 112Y and 112K) and an image defect determination device 40 are disposed in this order in the direction of the rotation, about the periphery of the intermediate transfer medium 32.

In order to attain high-speed printing, a mode is preferable in which line heads having a length corresponding to the maximum image recordable width in the axial direction of the intermediate transfer drum 32 are used for the recording heads 112 (112C, 112M, 112Y and 112K), and each head is arranged in the axial direction of the intermediate transfer drum 32 in such a manner that the lengthwise direction of the head follows a direction (a direction substantially parallel to the axial direction of the intermediate transfer drum 32) substantially perpendicular to the direction of rotation of the intermediate transfer drum 32. For a mechanism to eject ink, either piezoelectric elements or heat generating bodies may be used. In cases of piezoelectric elements, in order to arrange the nozzles at high density on the ink ejection surface (nozzle surface), preferably, the nozzles have a two-dimensional staggered matrix arrangement so as to complement each other. Furthermore, desirably, the nozzle surface of each recording head 112 has a curved shape along the circumference of the intermediate transfer drum 32 in the breadthways direction of the head (i.e., a direction parallel to the rotational direction of the inter mediate transfer drum 32).

The image defect determination device 40 includes a CCD line sensor, and the like, and if there is a defect or fault in an image recorded on the intermediate transfer medium 32, then the image defect determination device 40 is able to identify the location thereof.

Moreover, as a further method of determining image defects, although not shown in the diagrams, a mode is possible in which sensors, such as pressure sensors, are disposed inside each of the recording heads 112 (112C, 112M, 112Y and 112K) to determine ejection failures. By combining these methods described above, the determination of image defects on the intermediate transfer medium can be carried out with greater accuracy.

The ink cleaning device 42 serves to remove an image recorded temporarily on the intermediate transfer medium 32, and it includes a sponge or a soft member made of soft fibers, so as not to cause damage to the surface of the intermediate transfer medium 32.

Furthermore, although a configuration with the four standard colors, C M Y and K, is described in the embodiment shown in FIG. 1, the combinations of the ink colors and the number of colors are not limited to these, and light and/or dark inks can be added as required. For example, a configuration is also possible in which print heads for ejecting light-colored inks such as light cyan and light magenta are added. By adopting this composition, it is possible to improve the tonal gradations further.

Next, the sequence of image correction according to the present embodiment is described with reference to FIG. 2.

When a printing instruction is issued via the host computer, initial settings are performed. More specifically, the value D of a counter is reset to 0 in step 201. Thereupon, image data to be printed is created in step 202, and in step 203, the recording heads 112 (112C, 112M, 112Y and 112K) record an image temporarily on the intermediate transfer medium 32. In step 204, the presence or absence of image defects in the image recorded on the intermediate transfer medium 32 is determined by the image defect determination device 40. If it is judged that there are no image defects in the image in step 204, then in step 205, the image recorded on the intermediate transfer medium 32 is transferred to the recording paper 16 by interposing the recording paper 16 between the intermediate transfer medium 32 and the transfer roller 34, and the recording paper 16 is then output. Thereafter, in step 206, it is judged whether or not there is still data to be printed, of the data instructed initially for printing. If it is judged that there remains no data that should be printed in step 206, then printing terminates. On the other hand, if it is judged that there still remains data to be printed in step 206, then the procedure returns to step 203.

If it is judged by the image defect determination device 40 in step 204 that there is an image defect, then the procedure advances to step 207 and the transfer roller 34 is separated from the intermediate transfer medium 32. Consequently, the image recorded on the intermediate transfer medium 32 is not transferred to the recording paper 16. Thereupon, in step 208, correction data is generated in accordance with the image information about the portions suffering image defects determined by the image defect determination device 40. In step 209, a partial image which corresponds to the only portions where there are image defects is recorded onto the intermediate transfer medium 32 by the recording heads 112 (112C, 112M, 112Y and 112K), on the basis of this image correction data. The image recorded initially on the intermediate transfer medium 32 by the recording heads 112 (112C, 112M, 112Y and 112K) still remains on the intermediate transfer medium 32 since the transfer roller 34 is separated from the intermediate transfer medium, and additional recording is hence carried out by the recording heads 112 (112C, 112M, 112Y and 112K) onto the intermediate transfer medium 32, only in the portions corresponding to the regions of the image defect. By performing the additional recording in this way, it is possible to avoid wasteful use of ink.

In step 210, the presence or absence of image defects in the image recorded on the intermediate transfer medium 32 on the basis of the correction image data is determined and judged again by the image defect determination device 40. If the image defect determination device 40 judges in step 210 that there are no image defects in the image, then the procedure advances to step 211 and the image recorded on the intermediate transfer medium 32 is transferred to the recording paper 16 by interposing the recording paper 16 between the intermediate transfer medium 32 and the transfer roller 34, and the recording paper 16 is then output. Thereafter, in step 212, it is judged whether or not there still remains data to be printed, of the data initially instructed for printing. If it is judged in step 212 that there remains no data to be printed, then the maintenance of the recording heads 112 (112C, 112M, 112Y and 112K) is carried out as indicated in step 213, and then the printing procedure terminates. On the other hand, if it is judged that there still remains data to be printed in step 212, then the procedure advances to step 214 and the subsequent whole correction data is created. Thereupon, the procedure returns to step 203.

Moreover, if it is judged in step 210 that there is an image defect, then in step 215, the value D of the counter is incremented by 1. Thereupon, in step 216, it is judged whether or not the value D of the counter has exceeded a prescribed value of X. If it is judged in step 216 that the value D of the counter exceeds X, then in step 217, the image recorded on the intermediate transfer medium 32 is removed by the ink cleaning device 42. Thereupon, the maintenance of the recording heads 112 (112C, 112M, 112Y and 112K) is carried out as indicated in step 218, and then the value D is reset to zero in step 219 and the procedure then returns to step 203.

On the other hand, if it is judged in step 216 that the value D of the counter does not exceed the prescribed value of X, then the procedure advances to step 207. X is the limit value for repeating the correction, and it is set to a desired value in accordance with the intended use of the apparatus.

Figure 2:
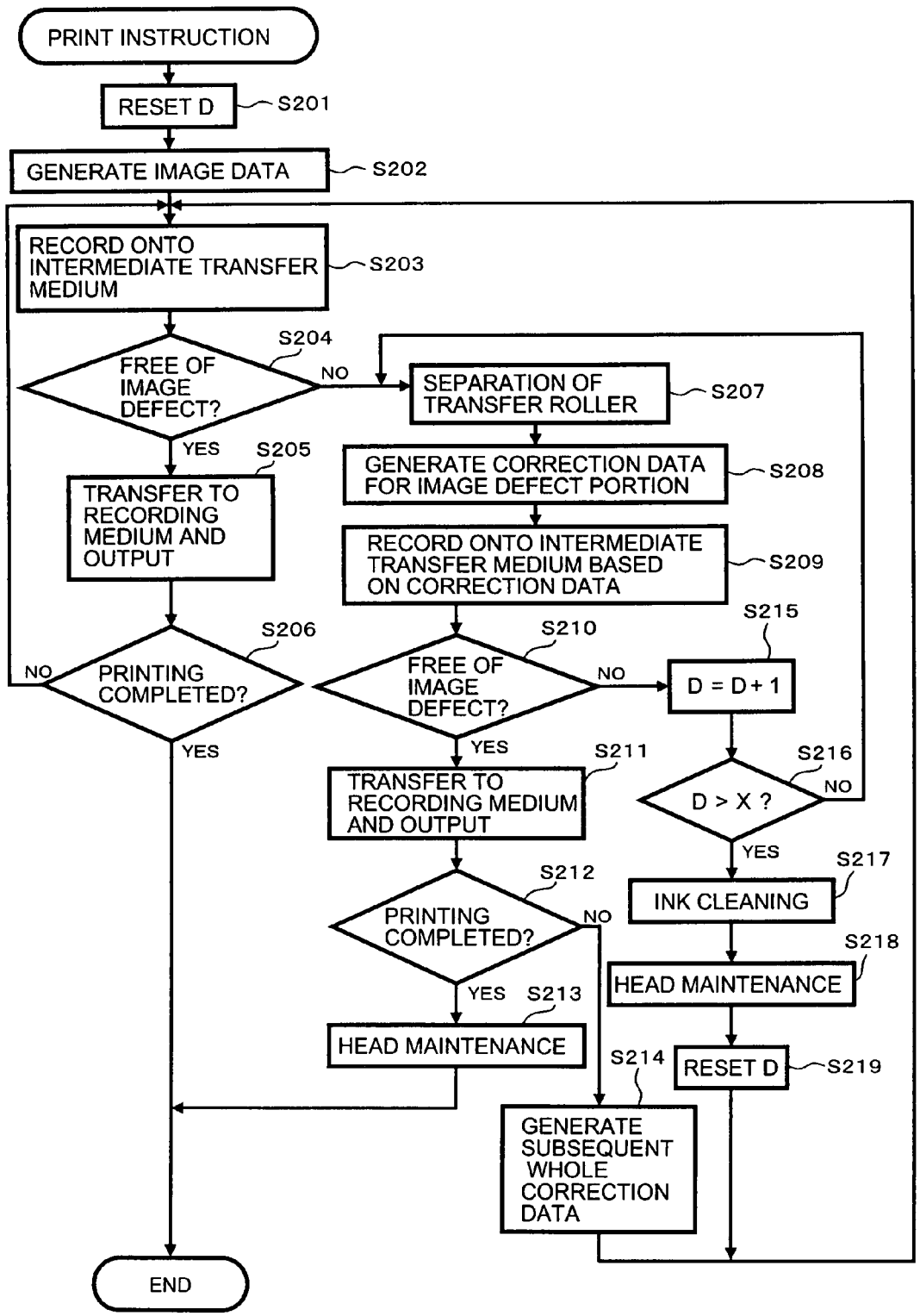
FIG. 2 is a flowchart showing an image correction according to the first embodiment.

In the first embodiment described above, image correction is carried out by following the sequence shown in FIG. 2 with respect to the image forming apparatus shown in FIG. 1.

Next, the structure of the heads in the present embodiment is described. The heads 112K, 112C, 112M, and 112Y of the respective ink colors have the same structure, and a reference numeral 150 is hereinafter designated to any of the heads.

Figure 3A:
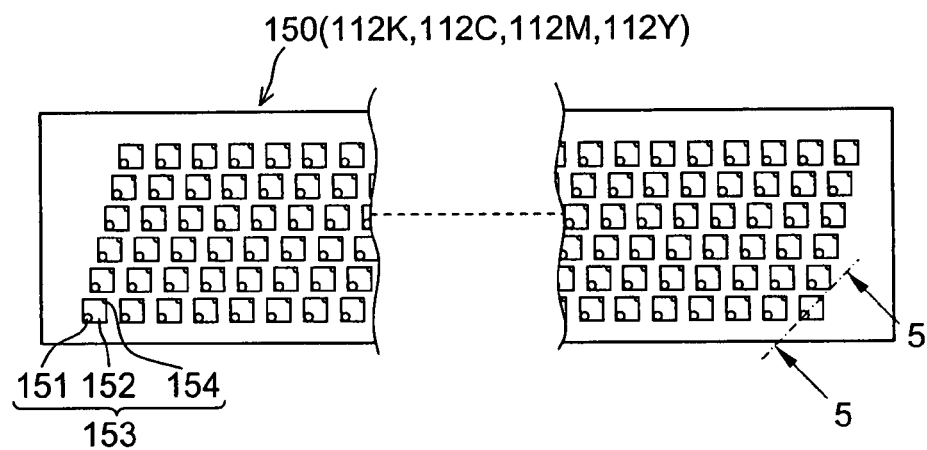
FIG. 3A is a plan view perspective diagram showing a structural embodiment of a print head of an image forming apparatus according to an embodiment of the present invention.
Figure 3B:
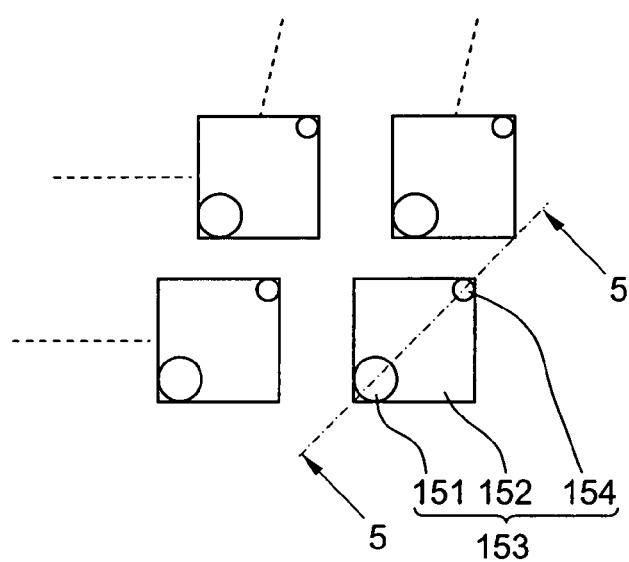
FIG. 3B is a principal enlarged view of the print head.
Figure 5:
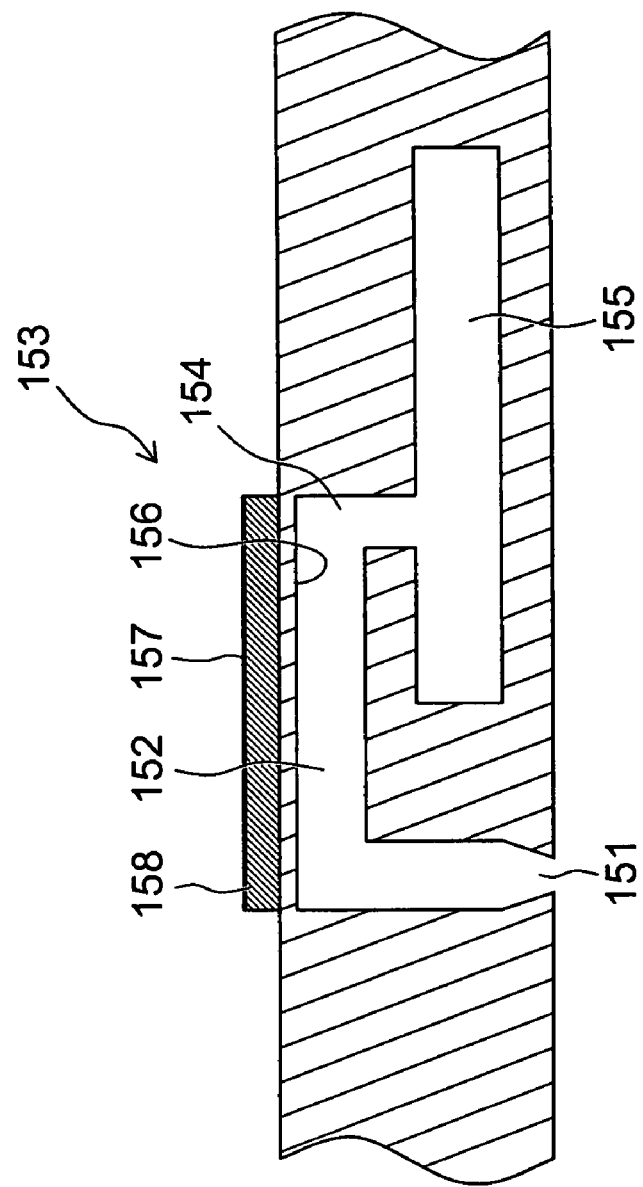
FIG. 5 is a cross-sectional view along line 5-5 in FIGS. 3A and 3B.

FIG. 3A is a perspective plan view showing an embodiment of the configuration of the head 150, FIG. 3B is an enlarged view of a portion thereof, FIG. 4 is a perspective plan view showing another embodiment of the configuration of the head 150, and FIG. 5 is a cross-sectional view taken along the line 5-5 in FIGS. 3A and 3B, showing the inner structure of a droplet ejection element (an ink chamber unit for one nozzle 151).

The nozzle pitch in the head 150 should be minimized in order to maximize the resolution of the dots printed on the recording paper 16. As shown in FIGS. 3A and 3B, the head 150 according to the present embodiment has a structure in which a plurality of ink chamber units (droplet ejection elements) 153, each comprising a nozzle 151 forming an ink ejection port, a pressure chamber 152 corresponding to the nozzle 151, and the like, are disposed two-dimensionally in the form of a staggered matrix, and hence the effective nozzle interval (the projected nozzle pitch) as projected in the lengthwise direction of the head (the direction perpendicular to the paper conveyance direction) is reduced and high nozzle density is achieved thereby.

The mode of forming one or more nozzle rows through a length corresponding to the entire width of the intermediate transfer medium 32 in a direction substantially perpendicular to the rotational direction of the intermediate transfer medium 32 is not limited to the embodiment described above. For example, instead of the configuration in FIG. 3A, as shown in FIG. 4, a line head having nozzle rows of a length corresponding to the entire width of the intermediate transfer medium 32 can be formed by arranging and combining, in a staggered matrix, short head modules 150' each having a plurality of nozzles 151 arrayed in a two-dimensional fashion.

As shown in FIGS. 3A and 3B, the planar shape of the pressure chamber 152 provided corresponding to each nozzle 151 is substantially a square shape, and an outlet port to the nozzle 151 is provided at one of the ends of the diagonal line of the planar shape, while an inlet port (supply port) 154 for supplying ink is provided at another end thereof. The shape of the pressure chamber 152 is not limited to that of the present embodiment and various modes are possible in which the planar shape is a quadrilateral shape (rhombic shape, rectangular shape, or the like), a pentagonal shape, a hexagonal shape, other polygonal shape, a circular shape, or an elliptical shape, or the like.

As shown in FIG. 5, each pressure chamber 152 is connected to a common channel 155 through the supply port 154. The common channel 155 is connected to an ink tank (not shown), which is a base tank that supplies ink, and the ink supplied from the ink tank is delivered through the common flow channel 155 to the pressure chambers 152.

Actuators 158 each of which is provided with an individual electrode 157 are bonded to a pressure plate (a diaphragm that also serves as a common electrode) 156 which forms the surface of one portion (in FIG. 5, the ceiling) of the pressure chambers 152. When a drive voltage is applied to an individual electrode 157 and the common electrode, the corresponding actuator 158 deforms, thereby changing the volume of the corresponding pressure chamber 152. This causes a pressure change which results in ink being ejected from the corresponding nozzle 151. For each actuator 158, it is possible to adopt a piezoelectric element using a piezoelectric body, such as lead zirconate titanate, barium titanate, or the like. When the actuator 158 returns to its original position after ejecting ink by the displacement, the pressure chamber 152 is replenished with new ink from the common flow channel 155, through the supply port 154.

Figure 6:
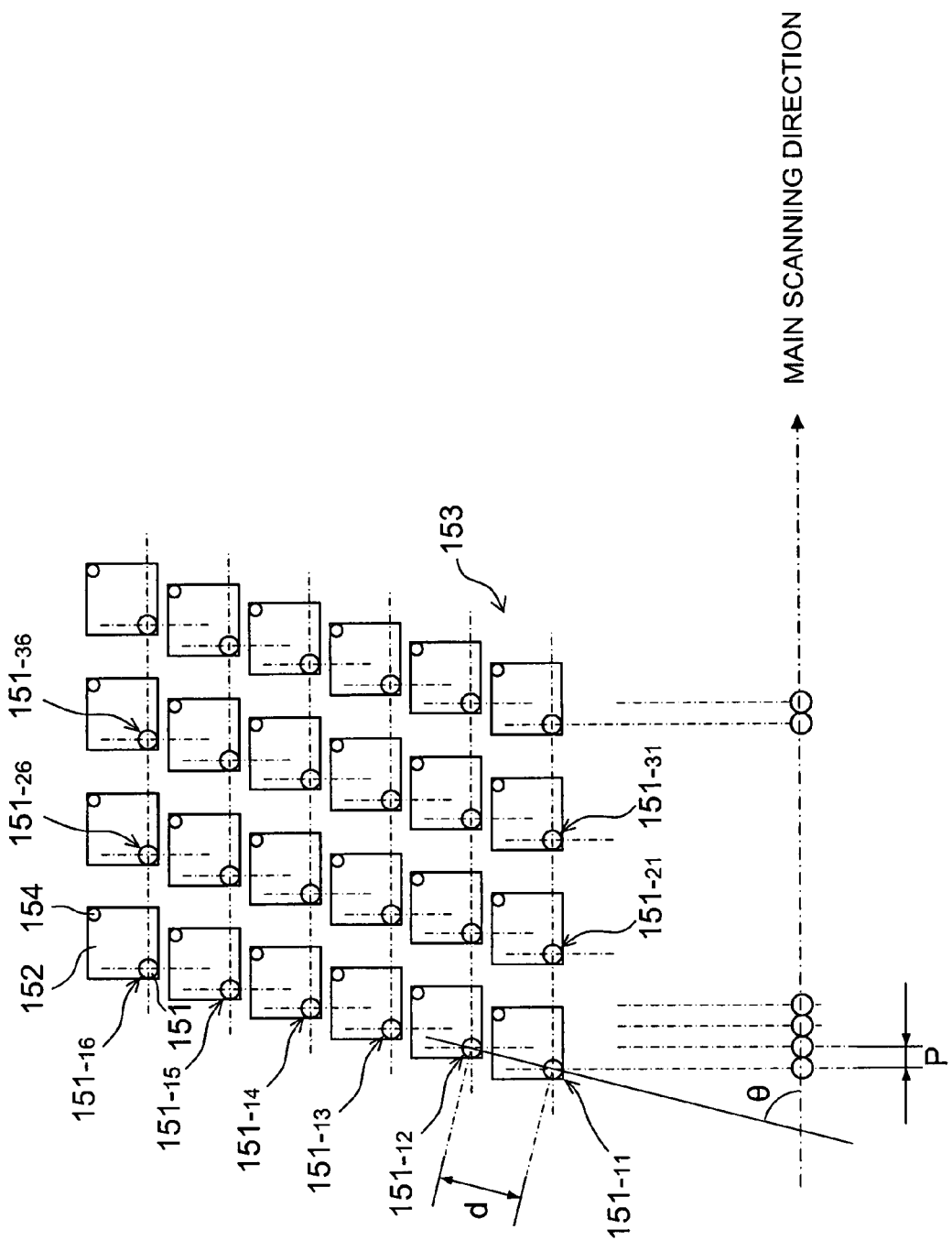
FIG. 6 is an enlarged view showing a nozzle arrangement in the print head shown in FIG. 3A.

As shown in FIG. 6, the high-density nozzle head according to the present embodiment is achieved by arranging the plurality of ink chamber units 153 having the above-described structure in a lattice fashion based on a fixed arrangement pattern, in a row direction which coincides with the main scanning direction, and a column direction which is inclined at a fixed angle of θ with respect to the main scanning direction, rather than being perpendicular to the main scanning direction.

More specifically, by adopting the structure in which the plurality of ink chamber units 153 are arranged at a uniform pitch d in line with a direction forming the angle of θ with respect to the main scanning direction, the pitch P of the nozzles projected so as to align in the main scanning direction is d×cos θ, and hence the nozzles 151 can be regarded to be equivalent to those arranged linearly at the fixed pitch P along the main scanning direction. Such configuration results in a nozzle structure in which the nozzle row projected in the main scanning direction has a high nozzle density of up to 2,400 nozzles per inch.

In a full-line head comprising rows of nozzles that have a length corresponding to the entire width of the image recordable width, the "main scanning" is defined as printing one line (a line formed of a row of dots, or a line formed of a plurality of rows of dots) in the width direction of the recording paper (the direction perpendicular to the conveyance direction of the recording paper) by driving the nozzles in one of the following ways: (1) simultaneously driving all the nozzles; (2) sequentially driving the nozzles from one side toward the other; and (3) dividing the nozzles into blocks and sequentially driving the nozzles from one side toward the other in each of the blocks.

In particular, when the nozzles 151 arranged in a matrix such as that shown in FIG. 6 are driven, the main scanning according to the above-described (3) is preferable. More specifically, the nozzles 151-11, 151-12, 151-13, 151-14, 151-15 and 151-16 are treated as a block (additionally; the nozzles 151-21, 151-22, ..., 151-26 are treated as another block; the nozzles 151-31, 151-32, ..., 151-36 are treated as another block; ...); and one line is printed in the width direction of the intermediate transfer medium 32 by sequentially driving the nozzles 151-11, 151-12, ..., 151-16 in accordance with the velocity of the intermediate transfer medium 32.

On the other hand, "sub-scanning" is defined as to repeatedly perform printing of one line (a line formed of a row of dots, or a line formed of a plurality of rows of dots) formed by the main scanning, while the full-line head and the intermediate transfer medium 32 are moved relatively to each other.

The direction indicated by one line (or the lengthwise direction of a band-shaped region) recorded by the main scanning as described above is referred to as the "main scanning direction", and the direction in which sub-scanning is performed, is referred to as the "sub-scanning direction". In the present embodiment, the rotational direction of the intermediate transfer medium 32 coincides with the sub-scanning direction and the direction perpendicular to same coincides with the main scanning direction.

In implementing the present invention, the arrangement of the nozzles is not limited to that of the embodiment shown. Moreover, a method is employed in the present embodiment where ink droplets are ejected by means of the deformation of the actuators 158, which is typically a piezoelectric element; however, in implementing the present invention, the method used for discharging ink is not limited in particular, and instead of the piezo jet method, it is also possible to apply various types of methods, such as a thermal jet method where the ink is heated and bubbles are caused to form therein by means of a heat generating body such as a heater, ink droplets being ejected by means of the pressure applied by these bubbles.

Figure 7:
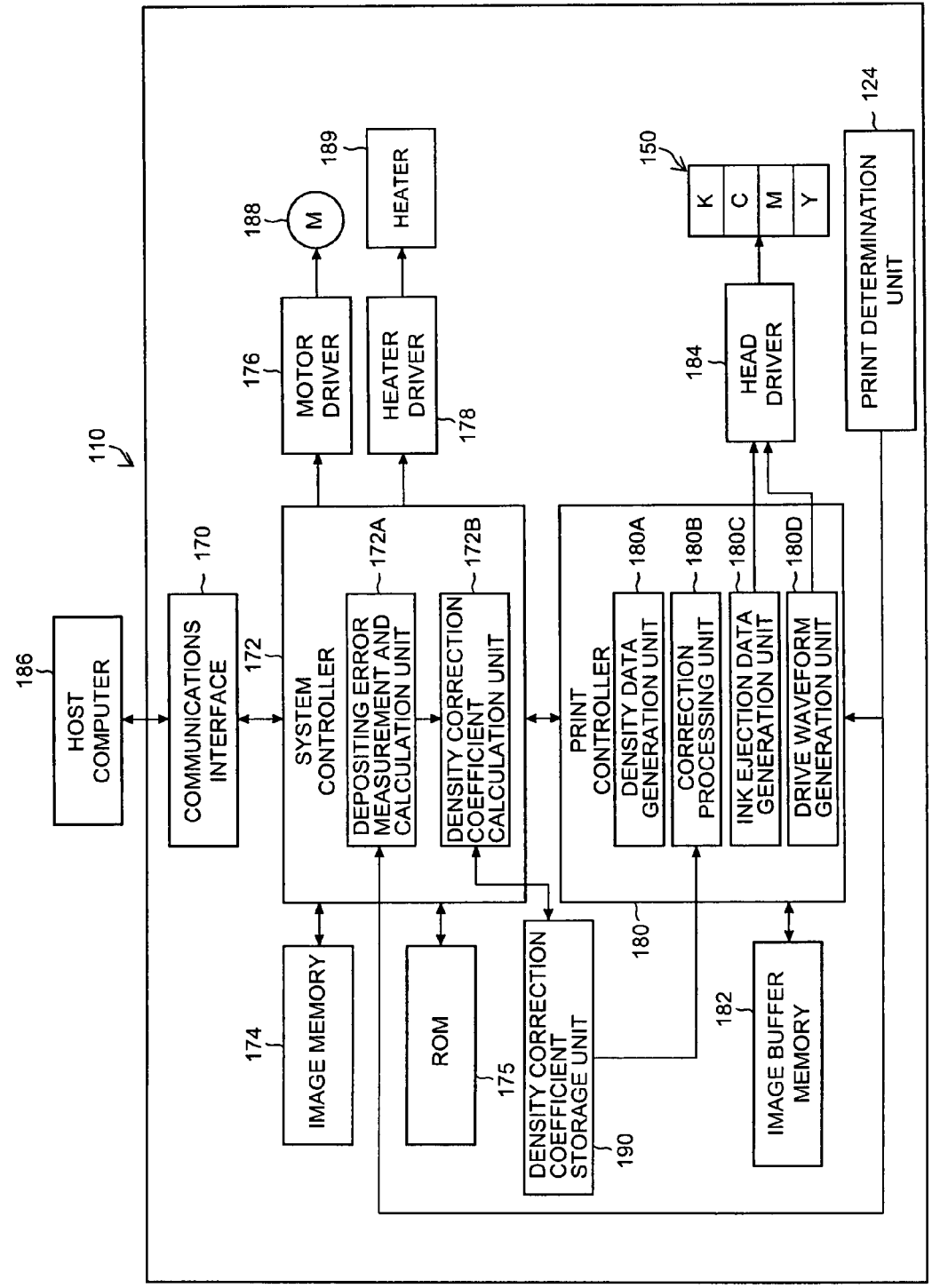
FIG. 7 is a principal block diagram showing the system configuration of an inkjet recording apparatus according to an embodiment of the present invention.

FIG. 7 is a block diagram showing the system configuration of the inkjet recording apparatus 110. The inkjet recording apparatus 110 comprises a communications interface 170, a system controller 172, an image memory 174, a ROM 175, a motor driver 176, a heater driver 178, a print controller 180, an image buffer memory 182, a head driver 184, and the like.

The communications interface 170 is an interface unit (image input device) for receiving image data sent from a host computer 186. A serial interface such as USB (Universal Serial Bus), IEEE 1394, Ethernet, and wireless network, or a parallel interface such as a Centronics interface may be used as the communications interface 170. A buffer memory (not shown) may be mounted in this portion in order to increase the communication speed.

The image data sent from the host computer 186 is received by the inkjet recording apparatus 110 through the communications interface 170, and is temporarily stored in the image memory 174. The image memory 174 is a storage device for storing images inputted through the communications interface 170, and data is written and read to and from the image memory 174 through the system controller 172. The image memory 174 is not limited to a memory composed of semiconductor elements, and a hard disk drive or another magnetic medium may be used.

The system controller 172 is constituted by a central processing unit (CPU) and peripheral circuits thereof, and the like, and it functions as a control device for controlling the whole of the inkjet recording apparatus 110 in accordance with a prescribed program, as well as a calculation device for performing various calculations. More specifically, the system controller 172 controls the various sections, such as the communications interface 170, image memory 174, motor driver 176, heater driver 178, and the like, and controls communications with the host computer 186 and writing and reading to and from the image memory 174 and the ROM 175. Also, the system controller 172 generates control signals for controlling a motor 188 of the conveyance system and a heater 189.

Furthermore, the system controller 172 comprises: a depositing error measurement and calculation unit 172A which performs calculation processing for generating depositing position error data on the basis of the data read in from the test pattern by a print determination unit 124 which is equivalent to the image defect detection device 40 shown in FIG. 1; and a density correction coefficient calculation unit 172B which calculates density correction coefficients from the information relating to the depositing position error thus obtained. The processing functions of the depositing error measurement and calculation unit 172A and the density correction coefficient calculation unit 172B can be achieved by means of an ASIC (application specific integrated circuit), software, or a suitable combination of same.

The density correction coefficient data obtained by the density correction coefficient calculation unit 172B is stored in a density correction coefficient storage unit 190.

The program executed by the CPU of the system controller 172 and the various types of data (including data of the test pattern for obtaining depositing position error) which are required for control procedures are stored in the ROM 175. The ROM 175 may be a non-writeable storage device, or it may be a rewriteable storage device, such as an EEPROM. By using the storage region of this ROM 175, the ROM 175 can be configured to be able to serve also as the density correction coefficient storage unit 190.

The image memory 174 is used as a temporary storage region for the image data, and it is also used as a program development region and a calculation work region for the CPU.

The motor driver (drive circuit) 176 drives the motor 188 of the conveyance system in accordance with commands from the system controller 172. The heater driver (drive circuit) 178 drives the heater 189 in accordance with commands from the system controller 172.

The print controller 180 is a control unit which functions as a signal processing device for performing various treatment processes, corrections, and the like, in accordance with the control implemented by the system controller 172, in order to generate signals for controlling droplet ejection from the image data (multiple-value input image data) in the image memory 174, and also functions as a drive control device which controls the ejection driving of the head 150 by supplying the ink ejection data thus generated to the head driver 184.

In other words, the print controller 180 includes a density data generation unit 180A, a correction processing unit 180B, an ink ejection data generation unit 180C and a drive waveform generation unit 180D. These functional units (180A to 180D) can be realized by means of an ASIC, software or a suitable combination of these.

The density data generation unit 180A is a signal processing device which generates initial density data for the respective ink colors, from the input image data, and it carries out density conversion processing (including UCR processing and color conversion) described later, and, where necessary, it also performs pixel number conversion processing.

The correction processing unit 180B in FIG. 7 is a processing device which performs density correction calculations using the density correction coefficients stored in the density correction coefficient storage unit 190, and it carries out the non-uniformity correction processing described later.

The ink ejection data generation unit 180C in FIG. 7 is a signal processing device which includes a half-toning processing device for converting the corrected density data generated by the correction processing unit 180B into binary (or multiple-value) dot data, and it performs the binary (or multiple-value) conversion processing described later. The ink ejection data generated by the ink ejection data generation unit 180C is supplied to the head driver 184 which controls the ink ejection operation of the head 150 accordingly.

The drive waveform generation unit 180D is a device for generating drive signal waveforms in order to drive the actuators 158 (see FIG. 5) corresponding to the respective nozzles 151 of the head 150. The signals (drive waveforms) generated by the drive waveform generation unit 180D is supplied to the head driver 184. The signals outputted from the drive signal generation unit 180D may be digital waveform data, or they may be analog voltage signals.

The image buffer memory 182 is provided with the print controller 180, and image data, parameters, and other data are temporarily stored in the image buffer memory 182 when image data is processed in the print controller 180. FIG. 7 shows a mode in which the image buffer memory 182 is attached to the print controller 180; however, the image memory 174 may also serve as the image buffer memory 182. Also possible is a mode in which the print controller 180 and the system controller 172 are integrated to form a single processor.

To give a general description of the sequence of processing from image input to print output, image data to be printed (original image data) is inputted from an external source through the communications interface 170, and is accumulated in the image memory 174. At this stage, multiple-value RGB image data is stored in the image memory 174, for example.

In this inkjet recording apparatus 110, an image which appears to have a continuous tonal graduation to the human eye is formed by changing the deposition density and the dot size of fine dots created by ink (coloring material), and therefore, it is necessary to convert the input digital image into a dot pattern which reproduces the tonal graduations of the image (namely, the light and shade toning of the image) as faithfully as possible. Therefore, original image data (RGB data) stored in the image memory 174 is sent to the print controller 180, through the system controller 172, and is converted to the dot data for each ink color by a half-toning technique, using dithering, error diffusion, or the like, by passing through the density data generation unit 180A, the correction processing unit 180B, and the ink ejection data generation unit 180C of the print controller 180.

In other words, the print controller 180 performs processing for converting the input RGB image data into dot data for the four colors of K, C, M, and Y. The dot data thus generated by the print controller 180 is stored in the image buffer memory 182. This dot data of the respective colors is converted into CMYK droplet ejection data for ejecting ink from the nozzles of the head 150, thereby establishing the ink ejection data to be printed.

The head driver 184 outputs drive signals for driving the actuators 158 corresponding to the nozzles 151 of the head 150 in accordance with the print contents, on the basis of the ink ejection data and the drive waveform signals supplied by the print controller 180. A feedback control system for maintaining constant drive conditions in the head may be included in the head driver 184.

By supplying the drive signals outputted by the head driver 184 to the head 150 in this way, ink is ejected from the corresponding nozzles 151. By controlling ink ejection from the print head 150 in synchronization with the rotational speed of the intermediate transfer medium 32, an image is formed on the intermediate transfer medium 32.

As described above, the ejection volume and the ejection timing of the ink droplets from the respective nozzles are controlled through the head driver 184, on the basis of the ink ejection data generated by implementing the required signal processing in the print controller 180, and the drive signal waveform. By this means, desired dot size and dot positions can be achieved.

As described with reference to FIG. 1, the image defect detection device 40 is a block including an image sensor which reads in the image recorded on the intermediate transfer medium 32, performs various signal processing operations, and the like, and determines the print situation (presence/absence of ejection, variation in droplet ejection, optical density, and the like), these determination results being supplied to the print controller 180 and the system controller 172.

The print controller 180 implements various corrections with respect to the head 150, according to requirements, and it implements control for carrying out cleaning operations (nozzle restoring operations), such as preliminary ejection, suctioning, or wiping, as and when necessary.

In the case of this embodiment, the combination of the image defect detection device 40 shown in FIG. 1 serving as the print determination unit 124 and the depositing error measurement calculation unit 172A corresponds to the "characteristics information acquisition unit", and the density correction coefficient calculation unit 172B corresponds to the "correction range setting unit" and the "correction coefficient determination unit". Furthermore, the correction processing unit 180B corresponds to the "correction processing unit".

According to the inkjet recording apparatus 110 having the foregoing composition, it is possible to obtain a satisfactory image in which density non-uniformity caused by error in depositing position is reduced.

Next, the correction method according to an embodiment of the present invention is described in detail.

Firstly, the principles of correction are described below. In the processing for density non-uniformities according to an embodiment of the present invention, when correcting the depositing position error of a particular nozzle, correction is performed by using N pieces of nozzles including the particular nozzle and the nozzles surrounding the particular nozzle. As described in detail below, the greater the number of nozzles N used for correction, the greater the correction accuracy.

Figure 13:
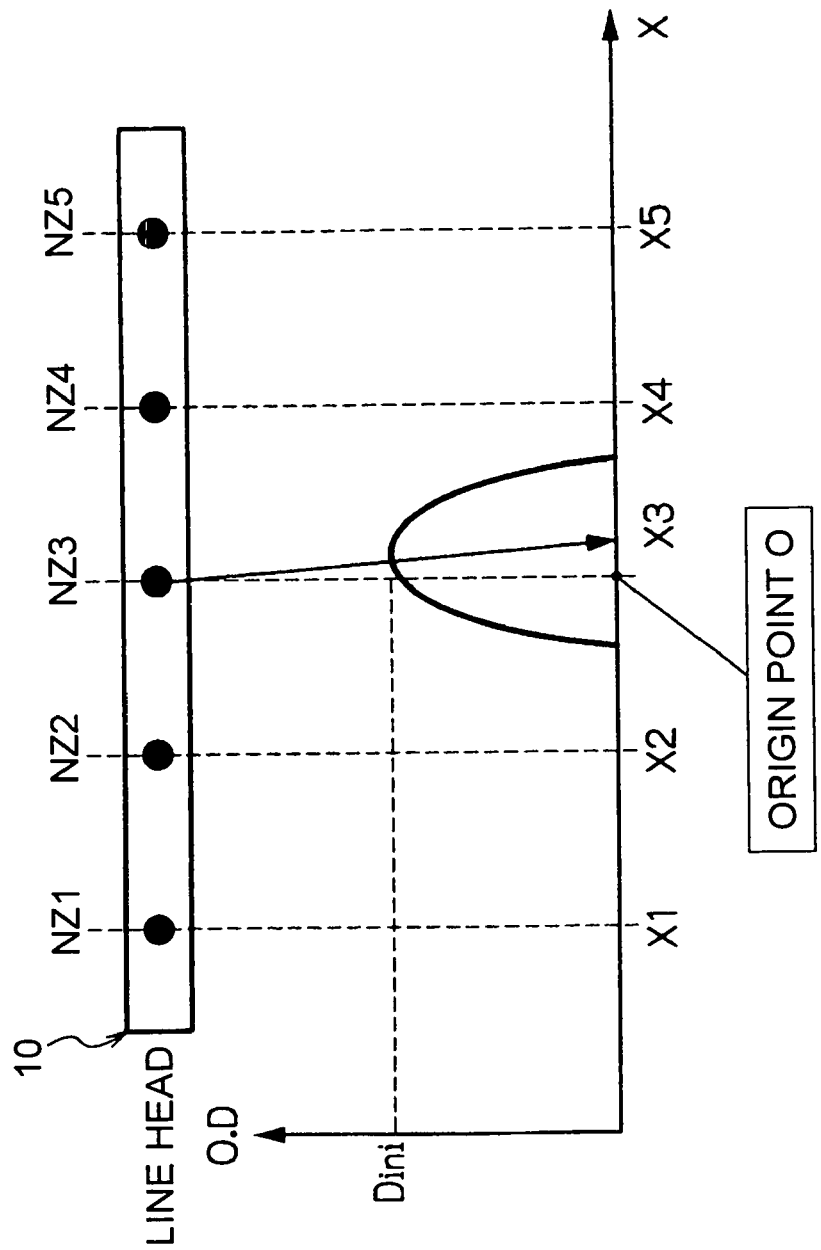
FIG. 13 is an illustrative diagram showing an embodiment of a density profile before correction of density non-uniformity according to an embodiment of the present invention.

FIG. 13 is a diagram of a mode before correction. In FIG. 13, the third nozzle (NZ3) from the left in a line head 10 (which is equivalent to a recording head) has a depositing position error, and the depositing position is displaced from the ideal depositing position (the origin O) in the rightward direction in the diagram (the main scanning direction indicated by the X axis). Furthermore, the graph shown in the bottom part of FIG. 13 indicates the density profile of the nozzle column direction (main scanning direction), obtained by averaging the print density produced by the droplets ejected from each nozzle in the rotational direction of the intermediate transfer medium (the sub-scanning direction). Here, since correction relating to the printing by the nozzle NZ3 is considered in FIG. 13, the density outputs of the nozzles other than the nozzle NZ3 are not shown in FIG. 13.

The initial output density of each of the nozzles NZ1 to NZ5 is $D_i = D_{INI}$ (where i is the nozzle number of 1, 2, 3, 4 or 5, and $D_{INI}$ is a uniform value), the origin O is set at the ideal depositing position of the nozzle NZ3, and the depositing position of each of the nozzles NZ1 to NZ5 is denoted by $X_i$.

Here, $D_i$ represents the output optical density of the nozzle when averaged physically in the rotational direction of the intermediate transfer medium, and corresponds to the average of the density data D(i, j) of pixels (where i is the nozzle number, and j is the pixel number in the rotational direction of the intermediate transfer medium) taken with respect to "j" in the data processing.

As shown in FIG. 13, the depositing position error of the nozzle NZ3 is represented by the divergence from the origin point O of the density output of the nozzle NZ3 (thick line). Here, the correction of this divergence in the output density is considered.

Figure 14:
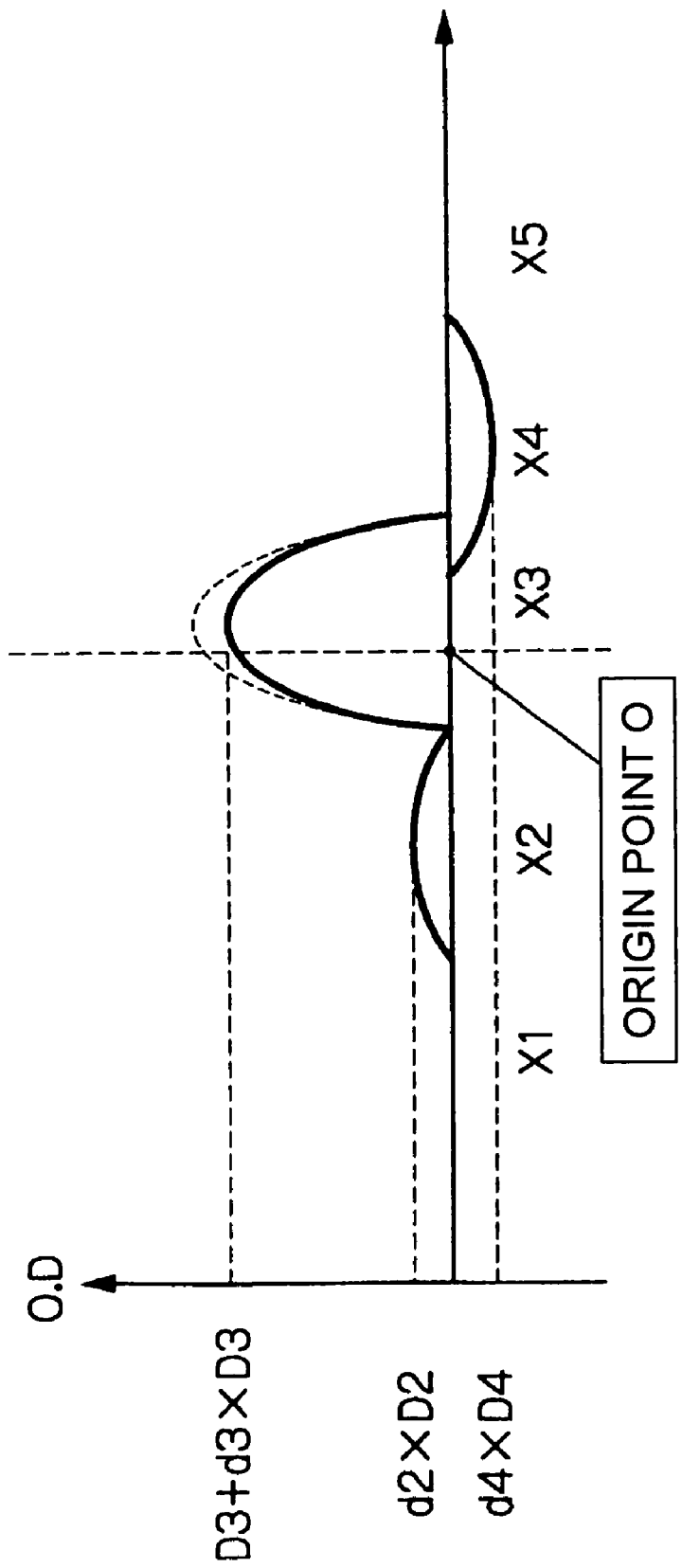
FIG. 14 is an illustrative diagram showing a state after correction of density non-uniformity according to an embodiment of the present invention.

FIG. 14 is a diagram of a mode after correction. Here, only the correction components are shown for the nozzles other than the nozzle NZ3. In the case of FIG. 14, the number of nozzles used in correction is N=3, and density correction coefficients d2, d3 and d4 are applied to the nozzles NZ2, NZ3 and NZ4, respectively. The density correction coefficients $d_i$ described here are defined as $D'_i = D_i + d_i \times D_i$, where $D'_i$ are the output densities after correction.

In the present embodiment, the density correction coefficient $d_i$ of each nozzle is specified so as to minimize the visibility of the density non-uniformity. Density non-uniformities in the print image are represented by the intensities in the spatial frequency characteristics (power spectrum). Since the characteristics of human vision mean that high-frequency components are not readily visible, the visibility of a density non-uniformity corresponds to the low-frequency component of the power spectrum. In this case, the density correction coefficient $d_i$ for each nozzle is specified so as to minimize the low-frequency component of the power spectrum.

The details of the derivation of the equation for specifying the density correction coefficient $d_i$ are described later, but to state the result in advance, the density correction coefficient $d_i$ corresponding to the depositing position error of a particular nozzle (correction object nozzle) is specified by means of the following equation:

$$d_i = \begin{cases} \dfrac{\prod_k x_k}{x_i \cdot \prod_{k \neq i}(x_k - x_i)} - 1 & \text{(for the correction object nozzle)} \\ \dfrac{\prod_k x_k}{x_i \cdot \prod_{k \neq i}(x_k - x_i)} & \begin{pmatrix}\text{for nozzles other than} \\ \text{the correction object nozzle}\end{pmatrix} \end{cases} \quad (1)$$

where $x_i$ is the depositing position of each nozzle, taking the origin at the ideal depositing position of the correction object nozzle; and Π means that the product is found for the N nozzles used for correction. When stated explicitly for the case of N=3 in FIG. 14, the following equations are derived:

$$d_2 = \frac{x_2 \cdot x_3 \cdot x_4}{x_2 \cdot (x_3 - x_2) \cdot (x_4 - x_2)}; \quad (2)$$

$$d_3 = \frac{x_2 \cdot x_3 \cdot x_4}{x_3 \cdot (x_2 - x_3) \cdot (x_4 - x_3)} - 1; \text{ and} \quad (3)$$

$$d_4 = \frac{x_2 \cdot x_3 \cdot x_4}{x_4 \cdot (x_2 - x_4) \cdot (x_3 - x_4)}. \quad (4)$$

It is possible to logically derive the density correction coefficient for each nozzle from the conditions for minimizing the low-frequency component of the power spectrum of the density non-uniformity.

Firstly, a density profile D(x) incorporating the error characteristics of each nozzle is defined as:

$$D(x) = \sum_i D_i \cdot z(x - x_i), \quad (5)$$

where i is the nozzle number, x is the positional coordinate on the medium (in the nozzle column direction), $D_i$ is the nozzle output density (the height of peak), z(x) is the standard density profile (where x=0 is the center of gravity), and $x_i = \overline{x}_i + \Delta x_i$ is the depositing position of the i-th nozzle (the ideal position+the error).

The density profile D(x) of the image is the sum of the density profiles printed by the nozzles, and the print model represents the printing performed by each nozzle (the density profile printed by each nozzle). The print model is represented separately by the nozzle output density $D_i$ and the standard density profile z(x).

The standard density profile z(x) has a limited spread equal to the dot diameter in strict terms, but if the correction of positional errors is considered to be a problem of balancing divergences in the density, then the important element is the central position (the position of the center of gravity; depositing position) of the density profile and the spread of the density profile is a secondary factor. Hence, an approximation that converts the profile by means of a δ function is appropriate. When a standard density profile represented with a δ function is supposed, then an arithmetical treatment can be achieved readily, and a precise solution for the correction coefficients can be obtained.

Figure 15:
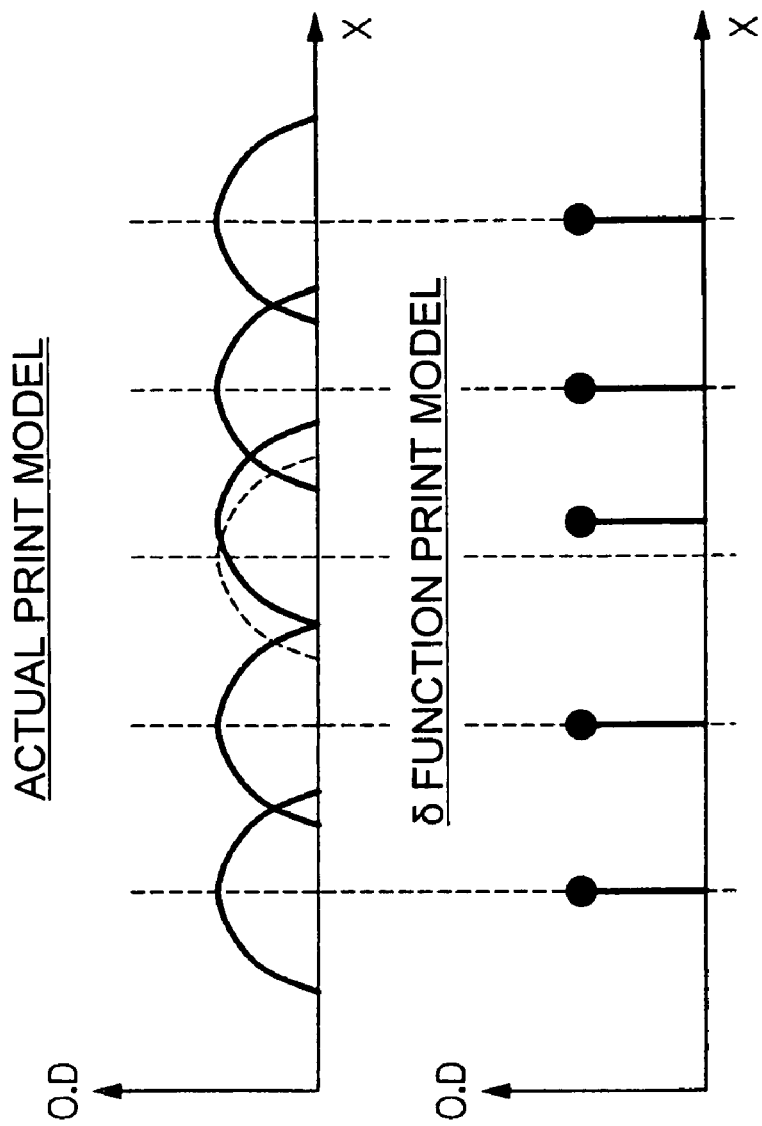
FIG. 15 is a diagram illustrating the relationship between a density profile of an actual print model and a density profile of a δ function type of print model.

FIG. 15 shows a graph of density profiles of an actual print model and a δ function type of print model. The standard density profile is represented as approximation using the δ function model as:

$$z(x-x_i) = \delta(x-x_i). \quad (6)$$

In calculating the correction coefficients, it is considered that the depositing position error $\Delta x_0$ of a particular nozzle (i=0) is to be corrected by means of the N pieces of nozzles including the particular nozzle and the nozzles surrounding the particular nozzle. Here, the number of the nozzle to be corrected is i=0. Attention is paid to the fact that each of the surrounding nozzles may also have a prescribed depositing position error.

The numbers (indexes) of the N nozzles including the nozzle to be corrected (central nozzle) are represented as:

$$\text{Nozzle index } i = -\frac{N-1}{2}, \ldots, -1, 0, 1, \ldots, \frac{N-1}{2}. \tag{7}$$

The number N must be an odd number in this expression, but in implementing the present invention, the number N is not necessarily limited to being an odd number.

The initial output density (the output density before correction) has a value only if i=0, and is represented as follows:

$$D_i = \begin{cases} D_{INI} & (i = 0) \\ 0 & (i \neq 0). \end{cases} \tag{8}$$

When the density correction coefficients are denoted by $d_i$, then the output densities $D'_i$ after correction are represented as follows:

$$D'_i = D_i + d_i \times D_{INI} = d'_i \times D_{INI}, \tag{9}$$

$$\text{where } d'_i = \begin{cases} d_i + 1 & (i = 0) \\ d_i & (i \neq 0). \end{cases}$$

In other words, when i=0, the corrected output density is the sum of the initial output density value and the correction value ($d_i \times D_{INI}$), and when i≠0, the corrected output density is equal to the correction value only.

The depositing position $x_i$ of each nozzle i is represented as:

$$x_i = \bar{x}_i + \Delta x_i, \tag{10}$$

where $\bar{x}_i$ is the ideal depositing position, $\Delta x_i$ is the depositing position error, and the ideal depositing position of the correction object nozzle is set as the origin ($\bar{x}_0 = 0$).

When using a δ function type of print model, the density profile after correction is expressed as follows:

$$D(x) = \sum_{i=-(N-1)/2}^{i=(N-1)/2} D'_i \cdot \delta(x - x_i) - D_{INI} \cdot \sum_{i=-(N-1)/2}^{i=(N-1)/2} d'_i \cdot \delta(x - x_i). \tag{11}$$

By Fourier transform on this equation, the following equation is obtained:

$$T(f) = \int_{-\infty}^{\infty} D(x) \cdot e^{ifx} dx \tag{12}$$

$$= \sum_i d'_i \cdot \int_{-\infty}^{\infty} \delta(x - x_i) \cdot e^{ifx} dx$$

$$= \sum_i d'_i \cdot e^{ifx_i},$$

where $D_{INI}$ is omitted since it is a common constant.

Minimizing the visibility of density non-uniformities means minimizing the low-frequency components of the power spectrum expressed as:

$$\text{Power spectrum} = \int T(f)^2 df \tag{13}$$

This can be approximated arithmetically by taking the differential coefficients (of the first-order, the second-order, . . . ) for f=0 in T(f) to be zero. Since there are N unknown numbers $d'_i$, then if conditions are used where the differential coefficients up to the (N−1)-th order are zero, and also including the condition for maintaining the direct current (DC) component, then all (N) of the unknown numbers $d'_i$ can be specified precisely. Thus, the following correction conditions are specified:

DC component: $T(f=0)=1$(condition for preserving the DC component); (14)

$$\text{First-order coefficient } \frac{d}{df} T(f = 0) = 0; \tag{15}$$

$$\text{Second-order coefficient } \frac{d^2}{df^2} T(f = 0) = 0; \tag{16}$$

$$\ldots$$

$$(N-1)\text{-th order coefficient } \frac{d^{N-1}}{df^{N-1}} T(f = 0) = 0. \tag{17}$$

In the δ function model, when the correction conditions are developed, N simultaneous equations relating to Di are reached by means of a simple calculation. When the correction conditions are rearranged, the following group of conditions (group of equations) is obtained:

$$\sum d'_i = 1; \tag{18}$$

$$\sum x_i d'_i = 0; \tag{19}$$

$$\sum x_i^2 d'_i = 0; \tag{20}$$

$$\ldots$$

$$\sum x_i^{N-1} d'_i = 0. \tag{21}$$

The meaning of this group of equations is that the first equation represents the preservation of the DC component and the second equation represents the preservation of the central position. The third and subsequent equations represent the fact that the (N−1)-th moment in the statistical calculation is zero.

The conditional equations thus obtained can be represented with a matrix format as follows:

$$\begin{pmatrix} 1 & \cdots & 1 & \cdots & \cdots & 1 \\ x_{-(N-1)/2} & \cdots & x_0 & \cdots & \cdots & x_{(N-1)/2} \\ x^2_{-(N-1)/2} & \cdots & x_0^2 & \cdots & \cdots & x^2_{(N-1)/2} \\ \vdots & & & \ddots & & \vdots \\ \vdots & & & & \ddots & \vdots \\ x^{N-1}_{-(N-1)/2} & \cdots & x_0^{N-1} & \cdots & \cdots & x^{N-1}_{(N-1)/2} \end{pmatrix} \begin{pmatrix} d'_{-(N-1)/2} \\ \vdots \\ d'_0 \\ \vdots \\ d'_{(N-1)/2} \end{pmatrix} = \begin{pmatrix} 1 \\ 0 \\ \vdots \\ 0 \\ \vdots \\ 0 \end{pmatrix}. \quad (22)$$

This coefficient matrix A is a so-called Vandermonde matrix, and it is known that this matrix equation can be converted to the following equation, by using the product of the differences:

$$|A| = \prod_{j>k}(x_j - x_k). \quad (23)$$

It is hence possible to determine the precise solution of $d'_i$ using the Crammer's formula. The detailed sequence of the calculation is omitted here, but by means of algebraic calculation, the following solution is obtained:

$$d'_i = \frac{\prod_k x_k}{x_i \cdot \prod_{k \ne i}(x_k - x_i)}. \quad (24)$$

Therefore, the correction coefficients $d_i$ are determined as follows:

$$d_i = \begin{cases} \dfrac{\prod_k x_k}{x_i \cdot \prod_{k \ne i}(x_k - x_i)} - 1 & (i=0) \\ \dfrac{\prod_k x_k}{x_i \cdot \prod_{k \ne i}(x_k - x_i)} & (i \ne 0). \end{cases} \quad (25)$$

Thus, the precise solution for the density correction coefficients $d_i$ is found, from the conditions where the differential coefficients at the origin of the power spectrum become zero. As the number of nozzles N used in the correction increases, the possibility of making the higher-order differential coefficients become zero increases, and hence, the low-frequency energy becomes smaller and the visibility of non-uniformities is reduced yet further.

In the present embodiment, the conditions where the differential coefficients at the origin become zero are used, but if the differential coefficients become sufficiently small values compared to the differential coefficients before the correction (such as 1/10 of the values before the correction), rather than being set completely to zero, it is still possible to make the low-frequency components of the power spectrum of the density non-uniformity sufficiently small. In other words, from the viewpoint of achieving conditions where the low-frequency components of the power spectrum are reduced to extent by which density non-uniformities become invisible, it is acceptable that the differential coefficients of the power spectrum at the origin are set to sufficiently small values (approximately 0), and that the range of each differential coefficient after correction can be set up to 1/10 of the absolute value of the differential coefficient before correction.

Figure 16:
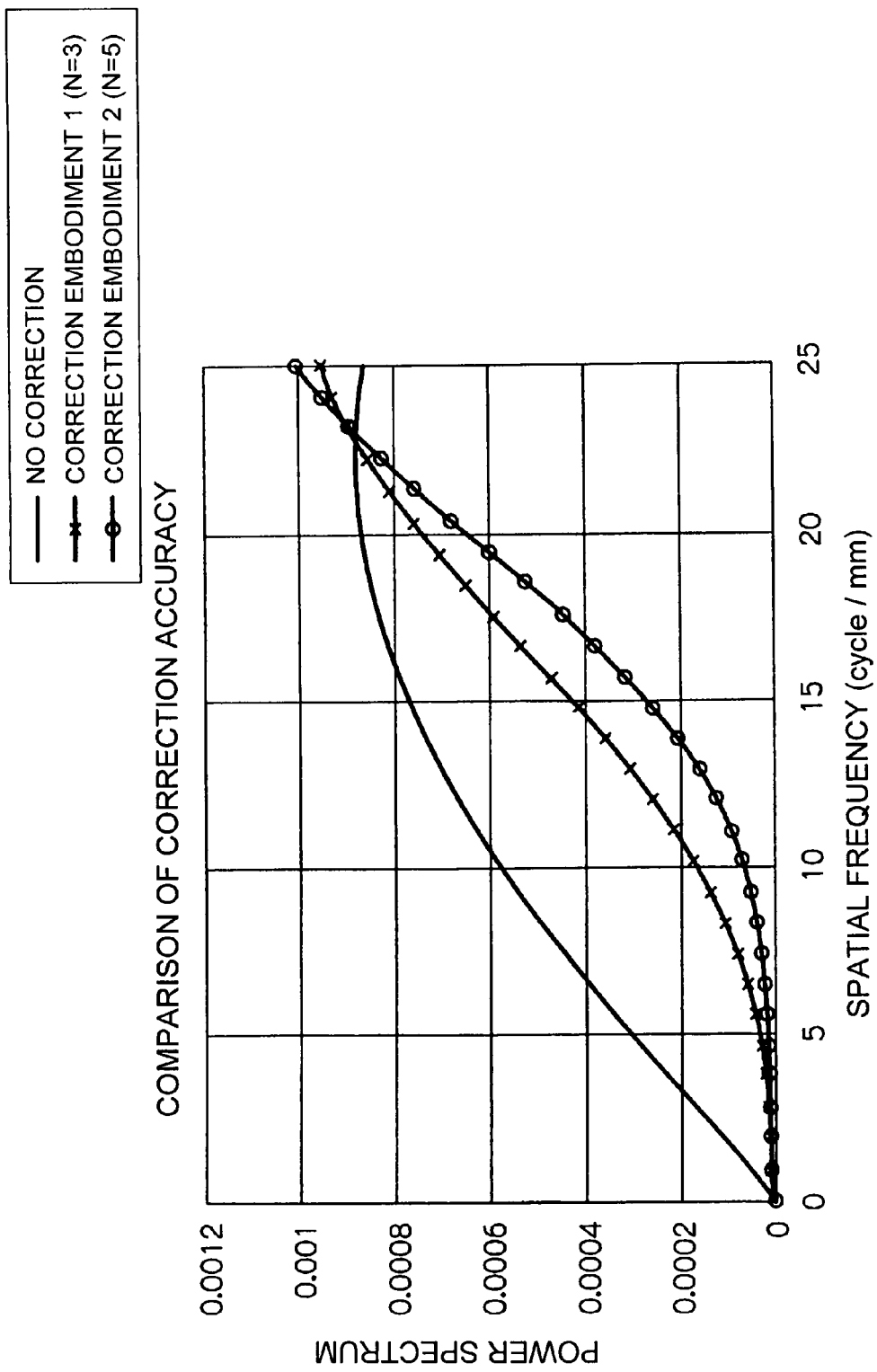
FIG. 16 is a graph of a power spectrum showing the results of correction according to an embodiment of the present invention.

FIG. 16 shows the spatial frequency characteristics (power spectra) after correction for a nozzle having the depositing position error shown in FIG. 13. FIG. 16 shows an embodiment of the correction when N=3 according to the embodiment of the present invention; and an embodiment of the correction when N=5 according to the embodiment of the present invention. The common conditions used in the calculations are that: the dot density is 1200 dots per inch (dpi); the diameter of the deposited dot is 32 µm; and the nozzle position error (depositing position error) is 10 µm.

If the human visual characteristics are taken into account, then the visibility of the density non-uniformity is represented by the power spectrum in the low-frequency region of the spatial frequency of 0 cycle/mm to 8 cycle/mm, and the smaller the power spectrum in this region, the greater the correction accuracy.

The correction embodiment 1 (N=3) according to the embodiment of the present invention shows a case where the power spectrum is substantially zero in the region of 0 cycle/mm to 5 cycle/mm, and a suitable correction effect is obtained in comparison with a case where there is no correction. Furthermore, in the correction embodiment 2 (N=5) according to the embodiment of the present invention, the power spectrum is further reduced in comparison with the correction embodiment 1 (N=3). Therefore, the greater the number of nozzles N used in correction, the greater the improvement in the correction effect. In the case of FIG. 13, although the output density of the nozzle NZ3 to be corrected does not project physically into areas corresponding to the nozzles NZ1 and NZ5, it is possible further to reduce the power spectrum by using the nozzles NZ1 and NZ5 for correction as well.

Figure 17:
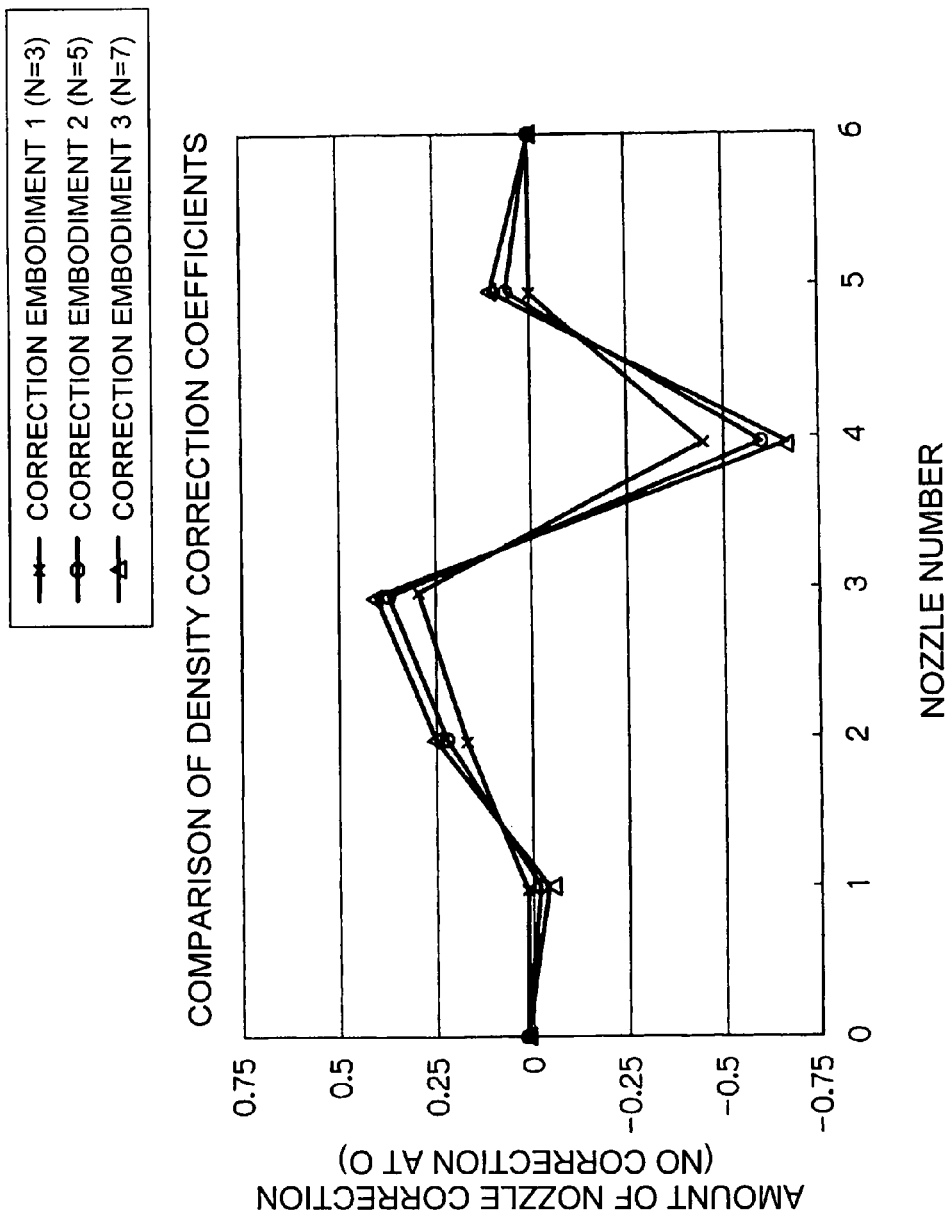
FIG. 17 is a graph illustrating the relationship between the number of nozzles (N) used for correction and the density correction coefficients.

FIG. 17 shows a comparison of the density correction coefficients of the correction embodiments 1 to 3 for different numbers of nozzles used in correction. The correction accuracy improves as the value of N increases, as revealed by a comparison between the correction embodiment 1 when N=3 according to the embodiment of the present invention, the correction embodiment 2 when N=5 according to the embodiment of the present invention, and the correction embodiment 3 when N=7 according to the embodiment of the present invention, but the range of the change in the density correction coefficients also increases. Furthermore, naturally, as the depositing position error of the nozzles increases, the range of the change in the density correction coefficients also increases.

If the density correction coefficient increases over a certain value, then this is undesirable since there is a possibility that the reproducibility of the input image is disrupted. Therefore, a greater than necessary increase in the N value is not desirable. Desirably, an optimal N value is set by taking account of both correction accuracy and image reproducibility. In the case of each of the correction embodiments 1 to 3 for N=3 to 7 shown in FIG. 17, the (absolute value of the) amount of change in the density correction coefficient is relatively small, and therefore density non-uniformities can be corrected without disrupting the reproduction of the input image.

The foregoing description relates to the method of specifying density correction coefficients relating to one particular nozzle (e.g., the nozzle NZ3 in FIG. 13). In actual practice, all of the nozzles in the head have some degree of depositing position errors, and therefore, it is desirable that corrections are performed in respect of all of these depositing position errors.

In other words, the aforementioned density correction coefficients for the surrounding N nozzles are determined with respect to every nozzle. Since the equations for minimizing the power spectra, which are described later and used when specifying the density correction coefficients, are linear, then it is possible to superpose the equations for each nozzle. Therefore, the total density correction coefficient for a nozzle is determined by finding the sum of the density correction coefficients obtained as described above.

More specifically, if the density correction coefficient for a nozzle i in relation to the positional error of a nozzle k is set to be d(i, k), then the value of this d(i, k) is determined by the above-described equation (1), and the total density correction coefficient $d_i$ for the nozzle i is obtained by linear combination of d(i, k) as follows:

$$d_i = \sum_k d(i, k). \quad (26)$$

In this embodiment, d(i, k) are accumulated for the index k assuming that the depositing position errors of all of the nozzles are to be corrected, but it is also possible to adopt a composition in which a certain value ΔX_thresh is set previously as a threshold value, and correction is performed selectively by setting as objects for correction only those nozzles that have a depositing position error exceeding this threshold value.

As stated above, the accuracy of correction is improved if the value of the number of nozzles N used for the correction is increased, but this also increases the breadth of change of the density correction coefficients and may lead to disruption of the reproduced image. Therefore, desirably, a limit range (a lower limit d_min to an upper limit d_max) is set for the correction coefficients in order to prevent the occurrence of image disruption, and the value N is set in such a manner that the total density correction coefficient determined by the above-described equation (26) comes within this limit range. In other words, the value N is set in such a manner that the relationship of d_min<$d_i$<d_max is satisfied.

From experimental observation, it is known that image disruption does not occur provided that d_min≧−1 and d_max≦1.

Figure 18:
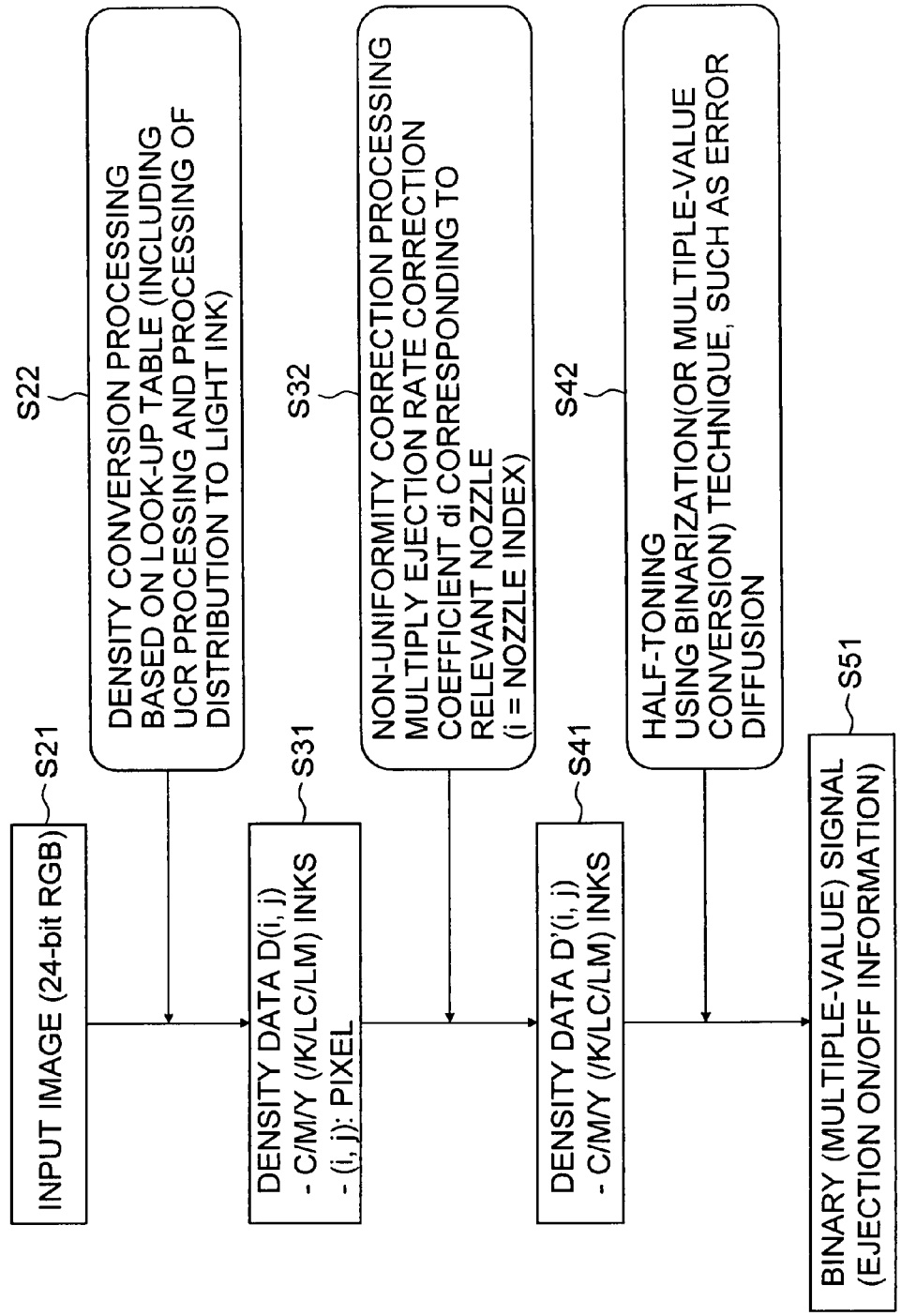
FIG. 18 is a flowchart showing a sequence of image processing according to an embodiment of the present invention.

An image processing sequence which incorporates the non-uniformity correction processing according to the present embodiment is shown in FIG. 18.

For example, the input image 21 of 24-bit RGB data is inputted, but there are no particular restrictions on the data format of the input image 21. Density conversion processing based on a look-up table is carried out on this input image 21 (step S22), thereby converting the input image into density data D(i, j) corresponding to the ink colors of the printers. Here, (i, j) indicates the position of a pixel, and hence the density data is assigned to each of pixels.

In this case, it is supposed that the image resolution of the input image 21 matches the image resolution (nozzle resolution) of the printer. If the image resolution of the input image does not match the image resolution (nozzle resolution) of the printer, then pixel number conversion processing is carried out on the input image, in accordance with the resolution of the printer.

The density conversion processing in step S22 uses a general process, which may include under color removal (UCR) processing, light ink distribution processing in the case of a system which uses light inks (light-colored inks of the same color), and so on.

For example, in the case of the printer having a three-ink composition comprising cyan (C), magenta (M) and yellow (Y), the image is converted into CMY density data D(i, j). Alternatively, in the case of the printer having a system which also uses other inks, such as black (K), light cyan (LC), and light magenta (LM) in addition to the three inks of CMY, then the image is converted into density data D(i, j) including these additional ink colors.

Non-uniformity correction processing is carried out with respect to the density data D(i, j) obtained by the density conversion processing (denoted with reference numeral 31 in FIG. 18) (step S32). Here, a calculation is performed in order to multiply the density correction coefficient (ejection rate correction coefficient) $d_i$ corresponding to the related nozzle, by the density data D(i, j).

Figure 19:
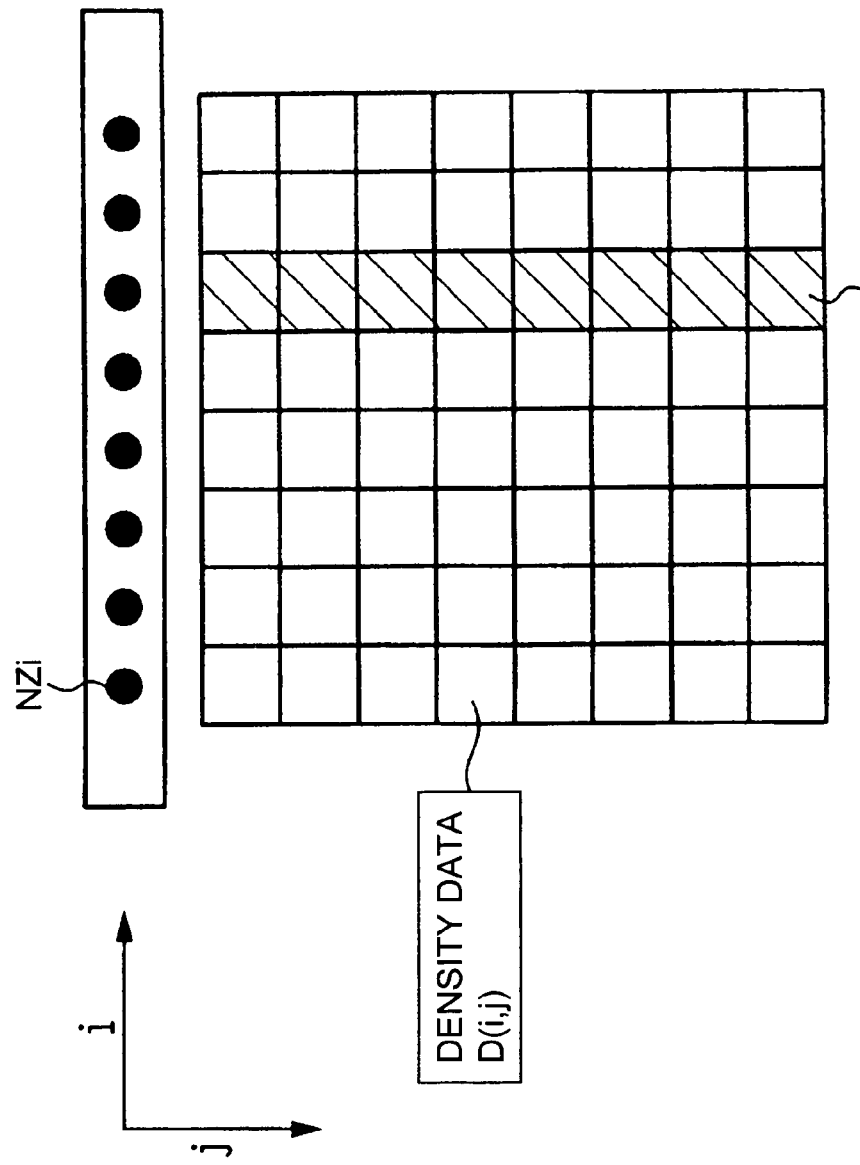
FIG. 19 is a conceptual diagram of density non-uniformity correction processing according to an embodiment of the present invention.

As shown in the schematic drawing in FIG. 19, the pixel position (i, j) on the image is specified by the position (main scanning direction position) i of the nozzle $NZ_i$, and a sub-scanning direction position j, and the density data D(i, j) is assigned to each of the pixels. If non-uniformity correction processing is carried out for the nozzle that ejects droplets to form the pixel column indicated by the shading in FIG. 19, then the density data D'(i, j) after correction can be calculated by the following equation:

$$D'(i,j)=D(i,j)+d_i \times D(i,j). \quad (27)$$

The corrected density data D'(i,j) is thus obtained.

By applying a half-toning process to the corrected density data D'(i,j) (denoted with reference numeral 41 in FIG. 18) (step S42), the data is converted into dot on/off signals (in binary data), or alternatively, if the dot sizes are variable, then the data is converted into multiple-value data signals including the size types (selection of dot size). There are no particular restrictions on the half-toning method used, and a commonly known binarizing (or multiple-value converting) technique, such as error diffusion, dithering, or the like, may be used.

Ink ejection (droplet ejection) data for each nozzle is generated on the basis of the binary (or multiple-value) signals thus obtained (denoted with reference numeral 51 in FIG. 18), and the ejection operation is controlled accordingly. Thus, density non-uniformities are suppressed and images of high quality can be formed.

FIG. 20 is a flowchart showing an embodiment of a process for updating the density correction coefficients (correction data). The correction data updating process starts when one of the following conditions applies, for instance.

Namely, the update processing shown in FIG. 20 starts if either: (a) an automatic checking device (sensor) which monitors the print result, judges that a non-uniformity streak has occurred in the printed image; or (b) a human observer judges that a non-uniformity streak has occurred in the printed image upon looking at the printed image, and performs a prescribed operation (such as inputting a command to start the updating process); or (c) a previously established update timing has been reached (the update timing can be set and judged by means of time management based on a timer, or the like, or operational record management based on a print counter).

In the present embodiment, the update processing starts when the image defect detection device 40 detects any image defect (i.e., in the above-described case (a)).

When the update process starts, firstly, a test pattern for obtaining depositing error data (a prescribed pattern which is determined previously) is printed (step S70).

Next, the depositing error data is obtained on the basis of the print result of the test pattern (step S72). For this obtainment of the depositing error data, it is possible to use an image reading device having an image sensor (imaging elements) (including a signal processing device for processing the captured image signal). The depositing error data includes, for example, information on depositing position error, information on optical density information, and the like.

The correction data (density correction coefficients) is calculated from the depositing error data obtained in step S72 (step S74). The method of calculating the density correction coefficients is as described above.

The information relating to the density correction coefficients thus derived is stored in a rewriteable storage device, such as an EEPROM (electronically erasable and programmable read only memory), and subsequently, the most recent correction coefficients are used.

Next, a second embodiment of the present invention is described.

Figure 8:
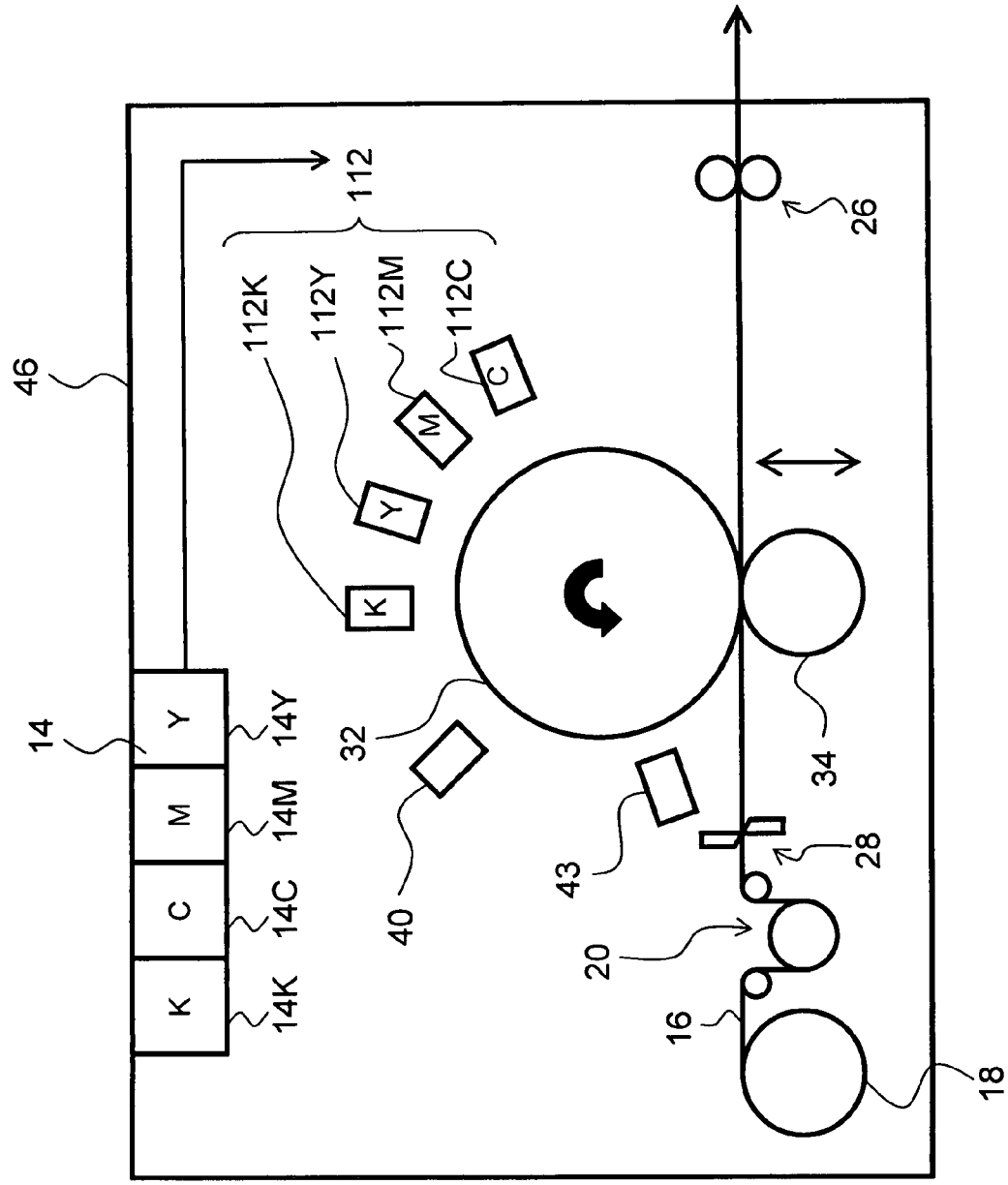
FIG. 8 is a general schematic view showing an inkjet recording apparatus which forms an image recording apparatus according to second, third and fifth embodiments of the present invention.

FIG. 8 is a general schematic drawing of an inkjet recording apparatus which forms an image recording apparatus according to the second embodiment of the present invention. As shown in FIG. 8, the inkjet recording apparatus 46 comprises: a plurality of recording heads (liquid ejection heads) 112 (112C, 112M, 112Y and 112K) which eject droplets of liquid or ink and are respectively provided for ink colors of cyan (C), magenta (M), yellow (Y) and black (K); an ink storing and loading unit 14 which has ink tanks 14C, 14M, 14Y and 14K for storing inks of C, M, Y and K to be supplied to the heads 112C, 112M, 112Y and 112K; an intermediate transfer medium or an intermediate transfer drum 32 which has a surface on which an image is temporarily recorded; a paper supply unit 18 which supplies recording paper 16 onto which the image is recorded by transferring the image having been temporarily recorded on the intermediate transfer medium 32; and a paper output unit 26 which outputs the recording paper 16 after recording.

As shown in FIG. 8, the recording heads 112 (112C, 112M, 112Y and 112K) corresponding to the inks of the colors are disposed in the sequence, cyan (C), magenta (M), yellow (Y) and black (K), from the upstream side, following the direction of rotation of the intermediate transfer medium 32 (the direction indicated by an arrow shown in FIG. 8).

By ejecting inks of the colors from the recording heads 112 (112C, 112M, 112Y and 112K), respectively, while the intermediate transfer medium 32 is made to rotate, an image is temporarily formed on the surface of the intermediate transfer medium 32.

The recording heads 112 (112C, 112M, 112Y and 112K) are supplied with liquids (hereinafter referred simply to as "ink") containing coloring material (dye or pigment), respectively.

A magazine for rolled paper (a container in which rolled paper is loaded) may be used as an embodiment of the paper supply unit 18, and a plurality of magazines with papers of different paper width and quality may be jointly provided. Moreover, paper may also be supplied from cassettes which contain cut papers loaded in layers and which are used jointly or in lieu of magazines for rolled papers.

In the present embodiment, a transfer image is formed firstly on the intermediate transfer medium 32 and solvent in ink deposited on the intermediate transfer medium is removed, and then the transfer image is transferred onto the recording paper 16. Hence, the image quality is less subject to the effects of permeation of ink into the recording paper. Therefore, it is possible to use various types of recording paper 16, and thus the freedom of choice of the recording paper 16 to be used is increased. Moreover, the intermediate transfer medium 32 includes very fine liquid-repelling sections and non-liquid-repelling sections. The non-liquid-repelling sections are permeable with respect to the ink solvent, and hence the occurrence of bleeding or stickiness on the recording medium can be reduced by absorbing the liquid from the inner side of the intermediate transfer medium 32.

The recording paper 16 delivered from the paper supply unit 18 may retain curl due to having been loaded in the magazine in the form of rolled paper. In order to remove this curl, a decurling unit 20 is provided after the paper supply unit 18. The decurling unit 20 applies heat to the recording paper 16, by means of a heating drum, in the direction opposite to the direction of the curl induced in the magazine. In this process, the heating temperature is preferably controlled in such a manner that the medium has a curl so that the surface on which the print is to be made is slightly rounded in the outward direction.

In a case in which roll paper is used, a cutter 28 is provided after the decurling unit 20 as shown in FIG. 8, and the roll paper is cut to a desired size by the cutter 28. The cut recording paper 16 is conveyed with the print surface facing upwards in the diagram, and the transfer image formed on the intermediate transfer medium 32 is transferred when the recording paper 16 is pinched between the intermediate transfer medium 32 and a transfer device or roller 34. When cut paper is used, the cutter 28 is not required.

The transfer roller 34, the recording heads 112 (112C, 112M, 112Y and 112K), an image defect determination device 40, and an ink cleaning device 43 are disposed in this order in the direction of rotation, about the periphery of the intermediate transfer medium 32.

In order to attain high-speed printing, a mode is preferable in which line heads having a length corresponding to the maximum image recordable width in the axial direction of the intermediate transfer drum 32 are used for the recording heads 112 (112C, 112M, 112Y and 112K), and each head is arranged in the axial direction of the intermediate transfer drum 32 in such a manner that the lengthwise direction of the head follows a direction (a direction substantially parallel to the axial direction of the intermediate transfer drum 32) substantially perpendicular to the direction of rotation of the intermediate transfer drum 32. For a mechanism to eject ink, either piezoelectric elements or heat generating bodies may be used. In cases of piezoelectric elements, in order to arrange the nozzles at high density on the ink ejection surface (nozzle surface), preferably, the nozzles have a two-dimensional staggered matrix arrangement so as to complement each other. Furthermore, desirably, the nozzle surface of each recording head 112 has a curved shape along the circumference of the intermediate transfer drum 32 in the breadthways direction of the head (i.e., a direction parallel to the rotational direction of the inter mediate transfer drum 32).

The image defect determination device 40 includes a CCD line sensor, and the like, and if there is a defect or fault in an image recorded on the intermediate transfer medium 32, then the image defect determination device 40 is able to identify the location thereof.

Moreover, as a further method of determining image defects, although not shown in the diagrams, a mode is possible in which sensors, such as pressure sensors, are disposed inside each of the recording heads 112 (112C, 112M, 112Y and 112K) to determine ejection failures. By combining these methods described above, the determination of image defects on the intermediate transfer medium can be carried out with greater accuracy.

The ink cleaning device 43 serves to remove an image recorded temporarily onto the intermediate transfer medium 32, and it includes a sponge or a soft member made of soft fibers, so as not to cause damage to the surface of the intermediate transfer medium 32.

Furthermore, although a configuration with the four standard colors, C M Y and K, is described in the embodiment shown in FIG. 8, the combinations of the ink colors and the number of colors are not limited to these, and light and/or dark inks can be added as required. For example, a configuration is also possible in which print heads for ejecting light-colored inks such as light cyan and light magenta are added. By adopting this composition, it is possible to improve the tonal gradations further.

Next, the sequence of image correction according to the present embodiment is described with reference to FIG. 9.

When a printing instruction is issued via the host computer, initial settings are performed. More specifically, the value D of the counter is reset to 0 in step 301.

Thereupon, image data to be printed is created in step 302, and in step 303, the recording heads 112 (112C, 112M, 112Y and 112K) record an image temporarily on the intermediate transfer medium 32. In step 304, the presence or absence of image defects in the image recorded on the intermediate transfer medium 32 is determined by the image defect determination device 40. If it is judged that there are no image defects in step 304, then in step 305, the image recorded on the intermediate transfer medium 32 is transferred to the recording paper 16 by interposing the recording paper 16 between the intermediate transfer medium 32 and the transfer roller 34, and the recording paper 16 is then output. Thereafter, in step 306, it is judged whether or not there is still data to be printed, of the data initially instructed for printing. If it is judged in step 306 that there remains no data that should be printed, then printing terminates. On the other hand, in step 306, if it is judged that there still remains data to be printed, then the procedure returns to step 303.

Furthermore, in step 304, if it is judged by the image defect determination device 40 that there is an image defect, then the procedure advances to step 307 and the image recorded on the intermediate transfer medium 32 is removed by the ink cleaning device 43, in other words, ink cleaning of the intermediate transfer medium 32 is carried out. In this embodiment, since the ink cleaning device 43 is disposed before the transfer roller 34 in terms of the direction of rotation of the intermediate transfer medium 32, then the ink is removed by the ink cleaning device 43 before reaching the transfer roller 34 and hence soiling of the transfer roller 34 is prevented. Thereupon, in step 308, correction data for the whole image is generated on the basis of the information determined by the image defect determination device 40. In step 309, a whole corrected image is recorded onto the intermediate transfer medium 32 using the recording heads 112 (112C, 112M, 112Y and 112K), in accordance with the correction data for the whole image.

In step 310, the presence or absence of image defects in the image recorded on the intermediate transfer medium 32 on the basis of the correction image data is determined and judged again by the image defect determination device 40. If there are no image defects in step 310, then the procedure advances to step 311 and the image recorded on the intermediate transfer medium 32 is transferred to the recording paper 16 by interposing the recording paper 16 between the intermediate transfer medium 32 and the transfer roller 34, and the recording paper 16 is then output. Thereafter, in step 312, it is judged whether or not there still remains data to be printed, of the data initially instructed for printing. If it is judged in step 312 that there remains no data to be printed, then the maintenance of the recording heads 112 (112C, 112M, 112Y and 112K) is carried out as indicated in step 313, and then the printing procedure terminates. On the other hand, if it is judged that there still remains data to be printed in step 312, then the procedure advances to step 314 and the subsequent whole correction data is created. Thereupon, the procedure returns to step 303.

Moreover, in step 310, if it is judged that there is an image defect, then in step 315, the value D of the counter is incremented by 1. Thereupon, in step 316, it is judged whether or not the value D of the counter has exceeded a prescribed value of X. If it is judged in step 316 that the value D of the counter exceeds X, then in step 317, the image recorded on the intermediate transfer medium 32 is removed by the ink cleaning device 43. Thereupon, the maintenance of the recording heads 112 (112C, 112M, 112Y and 112K) is carried out as indicated in step 318, and then the value D is reset to zero in step 319 and the procedure then returns to step 303.

On the other hand, if it is judged in step 316 that the value D of the counter does not exceed the prescribed value of X, then the procedure returns to step 307.

Figure 9:
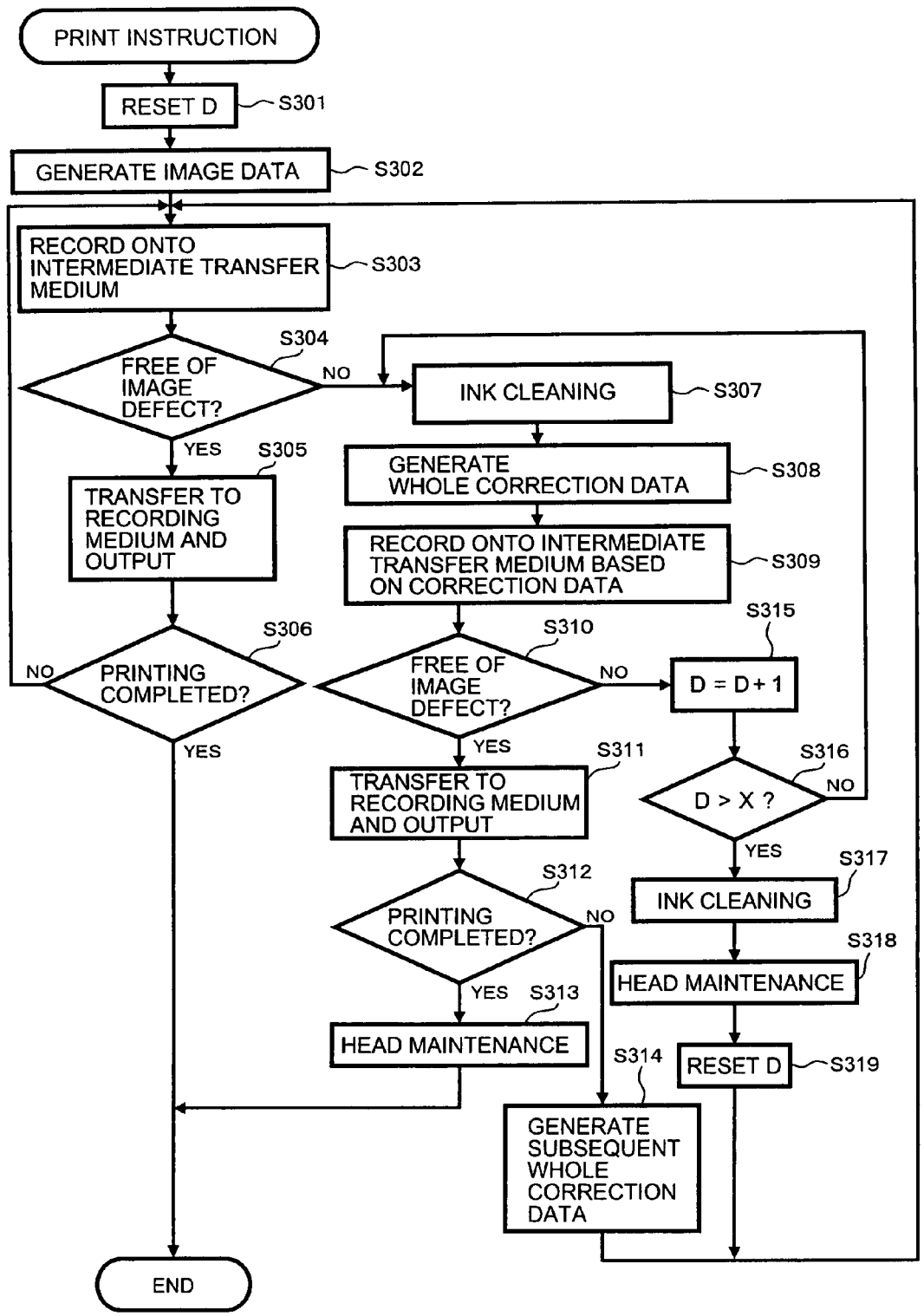
FIG. 9 is a flowchart showing an image correction according to the second embodiment.

As described above, according to the second embodiment, image correction is carried out by following the sequence shown in FIG. 9, with respect to the image forming apparatus shown in FIG. 8. In this embodiment, when an image defect is found, the image recorded on the intermediate transfer medium 32 is removed completely. Therefore, it is possible to avoid the phenomenon of depositing position displacement in which ink droplets deposited in the vicinity of previously deposited ink droplets are drawn towards the previously deposited ink droplets because of the surface tension of ink. Hence, even better image quality can be achieved.

The concrete correction method is based on a similar method to that described in the first embodiment.

Next, a third embodiment of the present invention is described.

Figure 10:
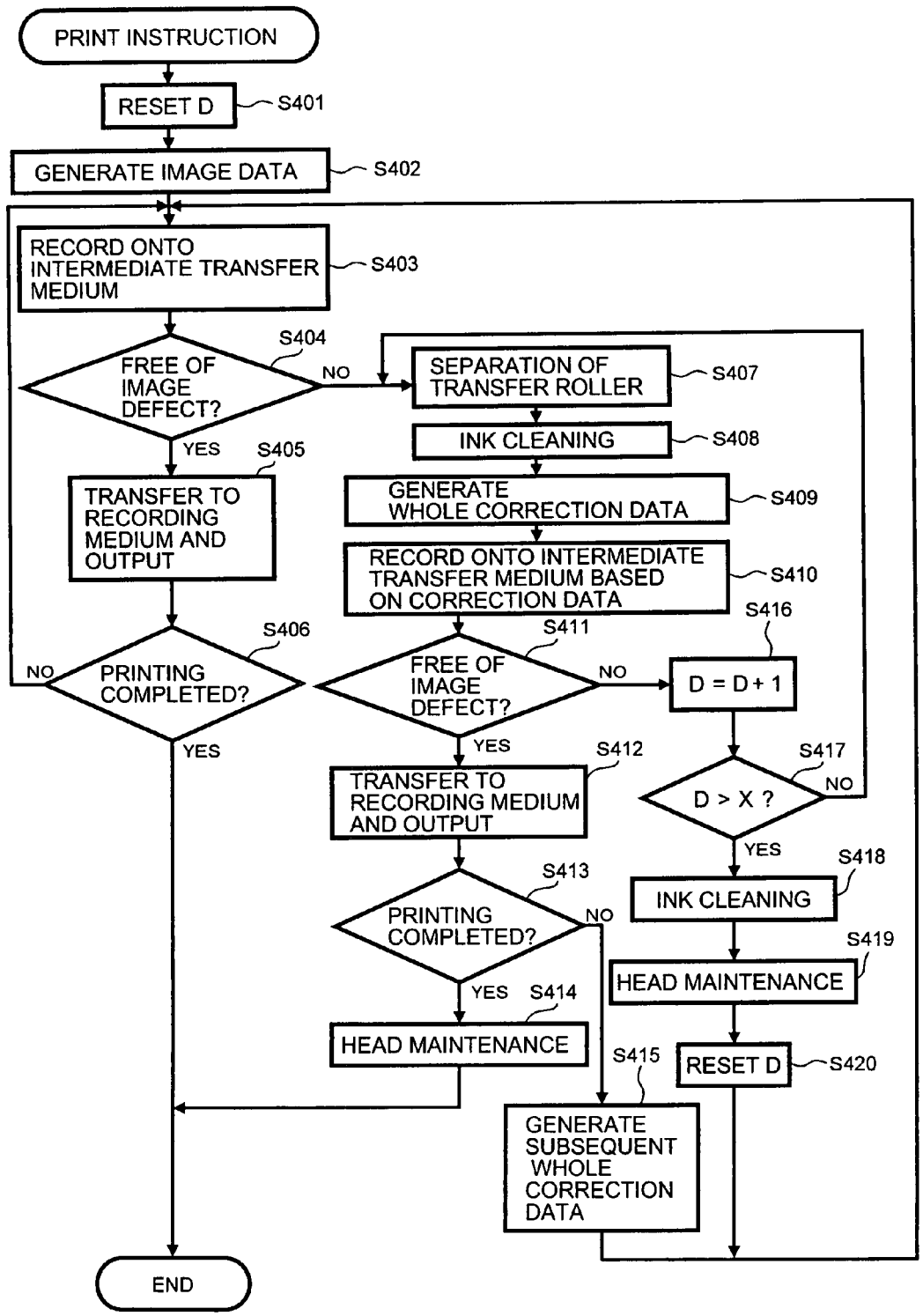
FIG. 10 is a flowchart showing an image correction according to the third embodiment.

The third embodiment uses an image forming apparatus having the same composition as the second embodiment shown in FIG. 8, and the sequence of image correction is described with reference to FIG. 10. The third embodiment differs from the second embodiment in that it includes a process of separating the transfer roller 34.

When a printing instruction is issued via the host computer, initial settings are performed. More specifically, the value D of the counter is reset to 0 in step 401.

Thereupon, image data to be printed is created in step 402, and in step 403, the recording heads 112 (112C, 112M, 112Y and 112K) record an image temporarily on the intermediate transfer medium 32. In step 404, the presence or absence of image defects in the image recorded on the intermediate transfer medium 32 is determined by the image defect determination device 40. If it is judged in step 404 that there are no image defects, then in step 405, the image recorded on the intermediate transfer medium 32 is transferred to the recording paper 16 by interposing the recording paper 16 between the intermediate transfer medium 32 and the transfer roller 34, and the recording paper 16 is then output. Thereafter, in step 406, it is judged whether or not there is still data to be printed, of the data initially instructed for printing. If it is judged in step 406 that there remains no data that should be printed, then printing terminates. On the other hand, in step 406, if it is judged that there still remains data to be printed, then the procedure returns to step 403, and the recording heads 112 (112C, 112M, 112Y and 112K) record an image on the intermediate transfer medium 32 according to the next printing instruction.

Furthermore, in step 404, if it is judged by the image defect determination device 40 that there is an image defect, then the procedure advances to step 407 and the separation of the transfer roller from the intermediate transfer medium 32 is performed. Thereupon, the procedure advances to step 408 and the image recorded on the intermediate transfer medium 32 is removed by the ink cleaning device 43, in other words, ink cleaning of the intermediate transfer medium 32 is carried out. Then, in step 409, correction data for the whole image is generated on the basis of the information determined by the image defect determination device 40. In step 410, a whole corrected image is recorded onto the intermediate transfer medium 32 using the recording heads 112 (112C, 112M, 112Y and 112K), in accordance with the correction data for the whole image.

In step 411, the presence or absence of image defects in the image recorded on the intermediate transfer medium 32 on the basis of the correction image data is determined and judged again by the image defect determination device 40. If it is judged in step 411 that no image defects are present in the image, then the procedure advances to step 412 and the image recorded on the intermediate transfer medium 32 is transferred to the recording paper 16 by interposing the recording paper 16 between the intermediate transfer medium 32 and the transfer roller 34, and the recording paper 16 is then output. Thereafter, in step 413, it is judged whether or not there still remains data to be printed, of the data initially instructed for printing. If it is judged in step 413 that there remains no data to be printed, then the maintenance of the recording heads 112 (112C, 112M, 112Y and 112K) is carried out as indicated in step 414, and then the printing procedure terminates. On the other hand, if it is judged in step 413 that there still remains data to be printed, then the procedure advances to step 415 and the subsequent whole correction data is created. Thereupon, the procedure returns to step 403 and the recording heads 112 (112C, 112M, 112Y, 112K) record an image according to the correction data thus created, on the intermediate transfer medium 32.

Moreover, in step 411, if it is judged that there is an image defect, then in step 416, the value D of the counter is incremented by 1. Thereupon, in step 417, it is judged whether or not the value D of the counter has exceeded a prescribed value of X. If it is judged in step 417 that the value D of the counter exceeds X, then in step 418, the image recorded on the intermediate transfer medium 32 is removed by the ink cleaning device 43. Thereupon, the maintenance of the recording heads 112 (112C, 112M, 112Y and 112K) is carried out as indicated in step 419, and then the value D is reset to zero in step 420 and the procedure then returns to step 403.

On the other hand, if it is judged in step 417 that the value D of the counter does not exceed the prescribed value of X, then the procedure returns to step 407.

According to the third embodiment, the sequence of image correction is described with reference to FIG. 10, with respect to the image forming apparatus shown in FIG. 8. The sequence of image correction according to the present embodiment includes separating the transfer roller 34 from the intermediate transfer medium 32, and therefore, such sequence may also be applied to the image forming apparatus having the composition shown in FIG. 1.

In the present embodiment, when an image defect is discovered, the image recorded on the intermediate transfer medium 32 is removed completely. Consequently, it is possible to avoid the phenomenon of depositing position displacement in which ink droplets deposited in the vicinity of previously deposited ink droplets are drawn towards the previously deposited ink droplets because of the surface tension of ink. Hence, even better image quality can be achieved.

The concrete correction method is based on a similar method to that described in the first embodiment.

Next, a fourth embodiment of the present invention is described.

Figure 11:
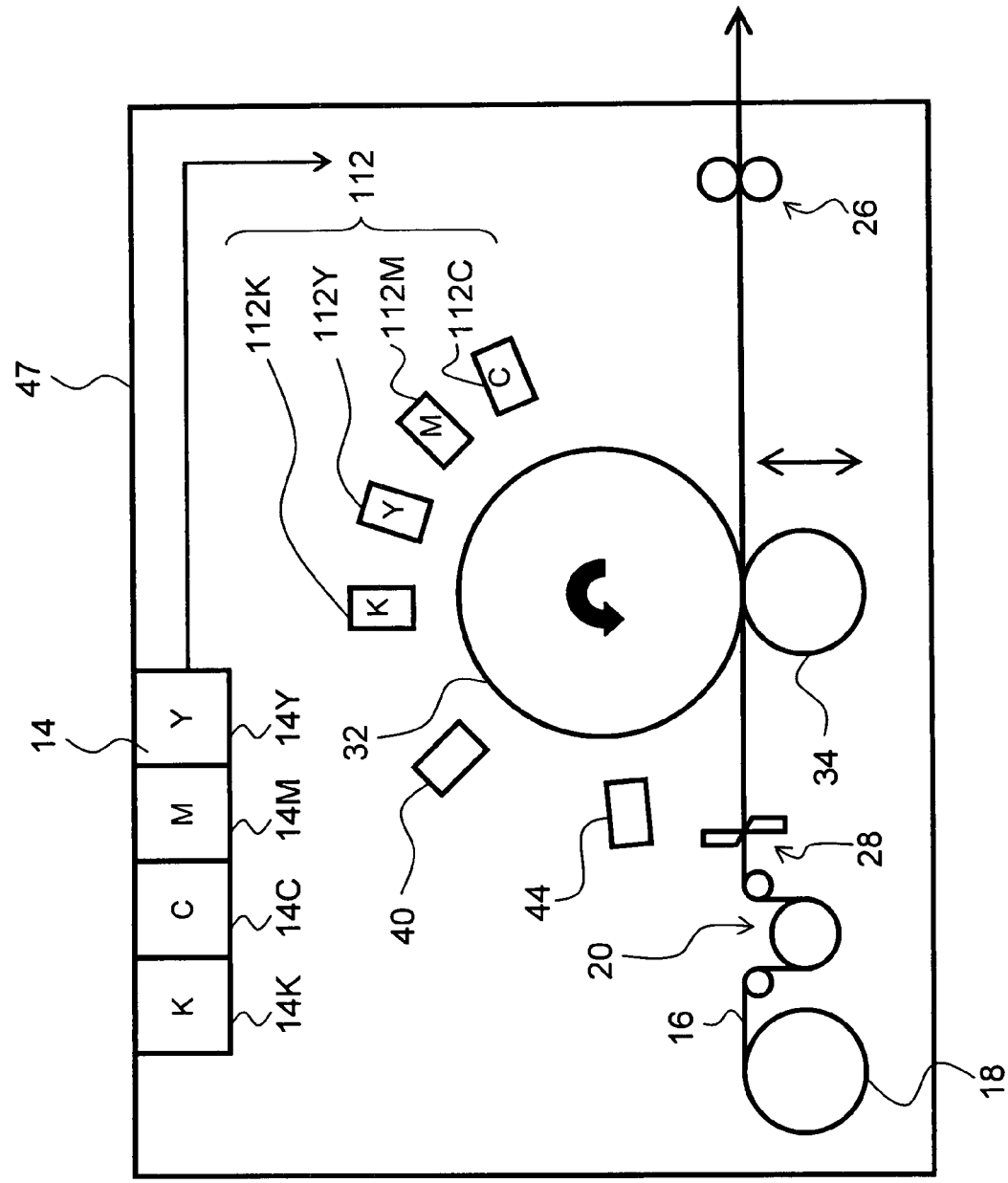
FIG. 11 is a general schematic view showing an inkjet recording apparatus which forms an image recording apparatus according to a fourth embodiment of the present invention.

FIG. 11 is a general schematic drawing of an inkjet recording apparatus which forms an image recording apparatus according to the fourth embodiment of the present invention. In the image recording apparatus according to the present embodiment, a solvent removal device is further added to the inkjet recording apparatus according to the first, second or third embodiment.

As shown in FIG. 11, the inkjet recording apparatus 47 comprises: a plurality of recording heads (liquid ejection heads) 112 (112C, 112M, 112Y and 112K) which eject droplets of liquid or ink and are respectively provided for ink colors of cyan (C), magenta (M), yellow (Y) and black (K); an ink storing and loading unit 14 which has ink tanks 14C, 14M, 14Y and 14K for storing inks of C, M, Y and K to be supplied to the heads 112C, 112M, 112Y and 112K; an intermediate transfer medium (or an intermediate transfer drum) 32 which has a surface on which an image is temporarily recorded; a paper supply unit 18 which supplies recording paper 16 onto which the image is recorded by transferring the image having been temporarily recorded on the intermediate transfer medium 32; and a paper output unit 26 which outputs the recording paper 16 after recording.

As shown in FIG. 11, the recording heads 112 (112C, 112M, 112Y and 112K) corresponding to the inks of the colors are disposed in the sequence, cyan (C), magenta (M), yellow (Y) and black (K), from the upstream side, following the direction of rotation of the intermediate transfer medium 32 (the direction indicated by an arrow shown in FIG. 11).

By ejecting inks of the colors from the recording heads 112 (112C, 112M, 112Y and 112K), respectively, while the intermediate transfer medium 32 is made to rotate, an image is temporarily formed on the surface of the intermediate transfer medium 32.

In the present embodiment, a transfer image is formed firstly on the intermediate transfer medium 32 and solvent in the ink deposited on the intermediate transfer medium is removed, and then the transfer image is transferred onto the recording paper 16. Hence, the image quality is less subject to the effects of permeation of ink into the recording paper. Therefore, it is possible to use various types of recording paper 16, and thus the freedom of choice of the recording paper 16 to be used is increased. Moreover, the intermediate transfer medium 32 includes very fine liquid-repelling sections and non-liquid-repelling sections. The non-liquid-repelling sections are permeable with respect to the ink solvent, and hence the occurrence of bleeding or stickiness on the recording medium can be reduced by absorbing the liquid from the inner side of the intermediate transfer medium 32.

The recording paper 16 delivered from the paper supply unit 18 may retain curl due to having been loaded in the magazine in the form of rolled paper. In order to remove this curl, a decurling unit 20 is provided posterior to the paper supply unit 18. The decurling unit 20 applies heat to the recording paper 16, by means of a heating drum, in the direction opposite to the direction of the curl induced in the magazine. In this process, the heating temperature is preferably controlled in such a manner that the medium has a curl so that the surface on which the print is to be made is slightly rounded in the outward direction.

In a case in which roll paper is used, a cutter 28 is provided posterior to the decurling unit 20 as shown in FIG. 11, and the roll paper is cut to a desired size by the cutter 28. The cut recording paper 16 is conveyed with the print surface facing upwards in the diagram, and the transfer image formed on the intermediate transfer medium 32 is transferred when the recording paper 16 is pinched between the intermediate transfer medium 32 and a transfer roller 34. When cut paper is used, the cutter 28 is not required.

The transfer roller 34, the recording heads 112 (112C, 112M, 112Y and 112K), an image defect determination device 40, and an ink cleaning device 44 are disposed in this order in the direction of rotation, about the periphery of the intermediate transfer medium 32.

The solvent removal device 44 does not remove dye, pigment, and the like, contained in ink, but removes solvent (e.g., water, alcohols, and high boiling point solvents (glycerin, diethylene glycol, glycol ethers, and the like)) contained in ink, and it is constituted by a soft material, such as a sponge, so as not to cause damage to the surface of the intermediate transfer medium 32. In the present embodiment, if the image defect determination device judges that there is an image defect, then the solvent removal from the intermediate transfer medium is not carried out. In this way, since such a solvent removal process is unnecessary, then the through-put is improved.

Furthermore, although not shown in FIG. 11, an ink cleaning device may be provided, similarly to the other embodiments, where necessary.

The ink cleaning device serves to remove an image recorded temporarily on the intermediate transfer medium 32, and it includes a sponge or a soft member made of soft fibers, so as not to cause damage to the surface of the intermediate transfer medium 32.

In order to attain high-speed printing, a mode is preferable in which line heads having a length corresponding to the maximum image recordable width in the axial direction of the intermediate transfer drum 32 are used for the recording heads 112 (112C, 112M, 112Y and 112K), and each head is arranged in the axial direction of the intermediate transfer drum 32 in such a manner that the lengthwise direction of each head follows a direction (a direction substantially parallel to the axial direction of the intermediate transfer drum 32) substantially perpendicular to the direction of rotation of the intermediate transfer drum 32. For a mechanism to eject ink, either piezoelectric elements or heat generating bodies may be used. In cases of piezoelectric elements, in order to arrange the nozzles at high density on the ink ejection surface (nozzle surface), preferably, the nozzles have a two-dimensional staggered matrix arrangement so as to complement each other. Furthermore, desirably, the nozzle surface of the recording head 112 has a curved shape along the circumference of the intermediate transfer drum 32 in the breadthways direction of the head.

The image defect determination device 40 includes a CCD line sensor, and the like, and if there is a defect or fault in an image recorded on the intermediate transfer medium 32, then the image defect determination device 40 is able to identify the location thereof.

Moreover, as a further method of determining image defects, although not shown in FIG. 11, a mode is possible in which sensors, such as pressure sensors, are disposed inside each of the recording heads 112 (112C, 112M, 112Y and 112K) to determine ejection failures. By combining these methods described above, the determination of image defects on the intermediate transfer medium can be carried out with greater accuracy.

In an image forming apparatus having a solvent removal device 44 of this kind according to the present embodiment, the step of removing solvent by the solvent removal device 44 is omitted if an image defect is determined by the image defect determination device 40.

In general, if recording is carried out again on the intermediate transfer medium 32 after the solvent is removed, the ejection droplet shape is liable to vary from that recorded previously, and consequently disturbance is liable to occur in the image; however, according to the present embodiment, it is possible to prevent the problems of such image disturbance.

Next, a fifth embodiment of the present invention is described.

Figure 12:
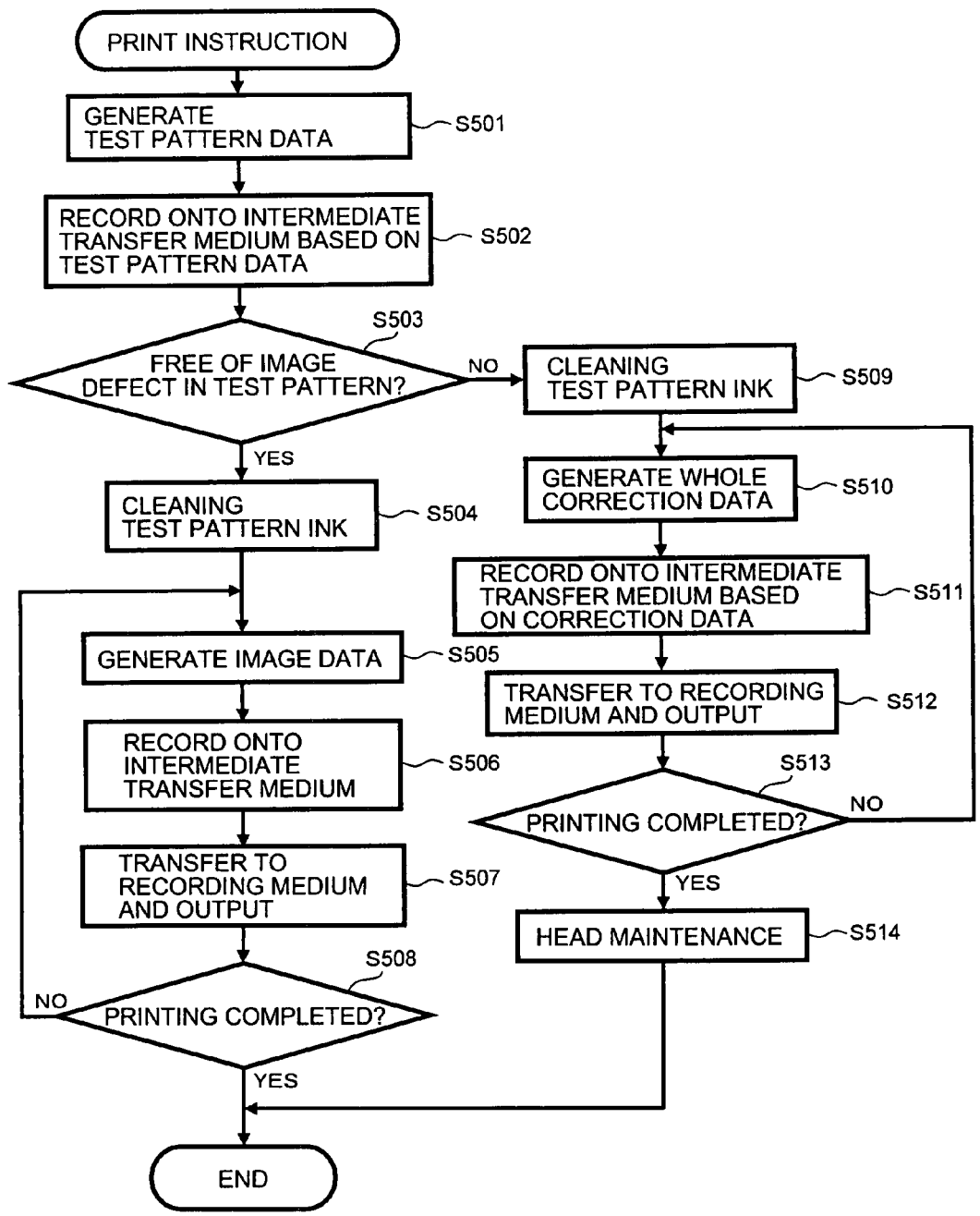
FIG. 12 is a flowchart showing an image correction according to the fifth embodiment.

An image forming apparatus according to the fifth embodiment has the composition shown in FIG. 8, and the sequence of image correction is described with reference to FIG. 12. In the fifth embodiment, a test pattern is recorded onto the intermediate transfer medium.

When a print instruction is issued by the host computer, test pattern data to be printed is created in step 501, and in step 502, the recording heads 112 (112C, 112M, 112Y and 112K) record a test pattern image temporarily on the intermediate transfer medium 32. In step 503, the presence or absence of image defects in the test pattern image recorded on the intermediate transfer medium 32 is determined by the image defect determination device 40. If it is judged in step 503 that there are no image defects, then in step 504, the test pattern image recorded on the intermediate transfer medium 32 is removed by the ink cleaning device 43. Thereupon, image data to be recorded on the recording paper 16 is created in step 505, and in step 506, the recording heads 112 (112C, 112M, 112Y and 112K) record an image temporarily onto the intermediate transfer medium 32. In step 507, the image recorded on the intermediate transfer medium 32 is transferred to the recording paper 16 by interposing the recording paper 16 between the intermediate transfer medium 32 and the transfer roller 34, and the recording paper 16 is then output. Thereafter, in step 508, it is judged whether or not there still remains data to be printed, of the data initially instructed for printing. If it is judged that there is no remaining data that should be printed in step 508, then printing terminates. On the other hand, if it is judged in step 508 that there still remains data to be printed, then the procedure returns to step 505, and the subsequent data is recorded onto the intermediate transfer medium 32 by the recording heads 112 (112C, 112M, 112Y and 112K).

Furthermore, if it is judged in step 503 by the image defect determination device 40 that there is an image defect, then in step 509, the test pattern image recorded on the intermediate transfer medium 32 is removed by the ink cleaning device 43. In this case, it is also possible to determine the presence or absence of image defects by means of the image defect determination device 40, as in the case of the third embodiment. Thereupon, in step 510, correction data for the whole image is generated on the basis of the information determined by the image defect determination device 40. In step 511, the corrected whole image is recorded onto the intermediate transfer medium 32 in accordance with the correction data thus obtained, by the recording heads 112 (112C, 112M, 112Y and 112K).

In step 512, the image recorded on the intermediate transfer medium 32 is transferred to the recording paper 16 by interposing the recording paper 16 between the intermediate transfer medium 32 and the transfer roller 34, and the recording paper 16 is then output. Thereafter, in step 513, it is judged whether or not there still remains data to be printed, of the data initially instructed for printing. If it is judged in step 513 that there remains no data to be printed, then the maintenance of the recording heads 112 (112C, 112M, 112Y and 112K) is carried out as indicated in step 514, and the printing procedure terminates. On the other hand, if it is judged in step 513 that there still remains data to be printed, the procedure returns to step 510.

In the present embodiment, similarly to the other embodiments, it is possible to provide the counter for the value D and to provide a mechanism whereby the ink on the intermediate transfer medium 32 is removed by the ink cleaning device 43 and the maintenance of the recording heads 112 (112C, 112M, 112Y and 112K) is carried out when this counter has reached a prescribed value. In this case, after issuing a print instruction and before generating test pattern data in step 501, it is necessary to carry out a step of resetting the value D of the counter.

The concrete correction method is based on a similar method to that described in the first embodiment.

The aforementioned embodiments are described with reference to cases where the intermediate transfer medium is constituted by an intermediate transfer rotating drum, but the intermediate transfer medium is not limited to an intermediate transfer rotating drum, and it may also be an intermediate transfer belt. Furthermore, a transfer roller is described as the transfer device, but the transfer device is not limited to a transfer roller, and it may also be a transfer belt.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image forming apparatus comprising:
    a recording head which has a plurality of recording elements;
    an intermediate transfer medium on which an image is recorded temporarily by the recording head while the intermediate transfer medium implements relative movement with respect to the recording head;
    an image defect determination device which is disposed on a downstream side of the recording head in terms of a direction of the relative movement of the intermediate transfer medium and which determines whether the image recorded on the intermediate transfer medium includes an image defect or not;
    a transfer device which is disposed on a downstream side of the image defect determination device in terms of the direction of the relative movement of the intermediate transfer medium and which transfers the image recorded on the intermediate transfer medium, to a recording medium; and
    an image correction device which creates correction data according to information about the image defect if the image defect determination device determines that the image recorded on the intermediate transfer medium includes the image defect,
    wherein, if the image defect determination device determines that the image recorded on the intermediate transfer medium includes the image defect, an image based on the correction data is recorded on the intermediate transfer medium by the recording head.

2. The image forming apparatus as defined in claim 1, wherein the intermediate transfer medium is separated from the transfer device if the image defect determination device determines that the image recorded on the intermediate transfer medium includes the image defect.

3. The image forming apparatus as defined in claim 2, wherein after the intermediate transfer medium is separated from the transfer device when the image defect determination device determines that the image recorded on the intermediate transfer medium includes the image defect, the image based on the correction data is recorded by the recording head on only a part of the intermediate transfer medium where the image defect determination device determines that there is the image defect.

4. The image forming apparatus as defined in claim 1, further comprising an ink cleaning device which is disposed on an upstream side of the recording head in terms of the direction of the relative movement of the intermediate transfer medium.

5. The image forming apparatus as defined in claim 4, wherein:
    if the image defect determination device determines that the image recorded on the intermediate transfer medium includes the image defect, then the transfer device is separated from the intermediate transfer medium, then the image based on the correction data is recorded on the intermediate transfer medium by the recording head, and then the image defect determination device performs a second determination of whether the image recorded on the intermediate transfer medium includes an image defect or not; and
    if the image defect determination device determines that the image recorded on the intermediate transfer medium includes the image defect at the second determination, then the ink deposited on the intermediate transfer medium by the recording head is removed by the ink cleaning device.

6. The image forming apparatus as defined in claim 1, wherein maintenance of the recording head is not carried out until printing according to a print instruction information received by the image forming apparatus is completed.

7. The image forming apparatus as defined in claim 1, wherein the image correction device comprises:
    a correction range setting unit which selects N correction recording elements (where N is an integer which is 2 or more) used for correcting output density, from the plurality of recording elements;
    a correction coefficient setting unit which sets density correction coefficients for the N correction recording elements according to correction conditions including a condition under which a power spectrum representing spatial frequency characteristics of a density non-uniformity due to recording characteristics of the plurality of recording elements has a differential coefficient of substantially zero at a frequency origin point ($f=0$); and
    a correction processing unit which performs calculation for correcting the output density according to the density correction coefficients set by the correction coefficient setting unit.

8. An image forming apparatus comprising:
    a recording head which has a plurality of recording elements;
    an intermediate transfer medium on which an image is recorded temporarily by the recording head while the intermediate transfer medium implements relative movement with respect to the recording head;
    an image defect determination device which is disposed on a downstream side of the recording head in terms of a direction of the relative movement of the intermediate transfer medium and which determines whether the image recorded on the intermediate transfer medium includes an image defect or not;
    an ink cleaning device which is disposed on a downstream side of the image defect determination device in terms of the direction of the relative movement of the intermediate transfer medium and which removes ink deposited on the intermediate transfer medium by the recording head;

a transfer device which is disposed on a downstream side of the ink cleaning device in terms of the direction of the relative movement of the intermediate transfer medium and which transfers the image recorded on the intermediate transfer medium, to a recording medium; and an image correction device which creates correction data according to information about the image defect if the image defect determination device determines that the image recorded on the intermediate transfer medium includes the image defect, wherein, if the image defect determination device determines that the image recorded on the intermediate transfer medium includes the image defect, then the ink deposited on the intermediate transfer medium by the recording head is removed by the ink cleaning device and an image based on the correction data is recorded on the intermediate transfer medium by the recording head.

9. The image forming apparatus as defined in claim 8, wherein maintenance of the recording head is not carried out until printing according to a print instruction information received by the image forming apparatus is completed.

10. The image forming apparatus as defined in claim 8, wherein the image correction device comprises:

a correction range setting unit which selects N correction recording elements (where N is an integer which is 2 or more) used for correcting output density, from the plurality of recording elements;

a correction coefficient setting unit which sets density correction coefficients for the N correction recording elements according to correction conditions including a condition under which a power spectrum representing spatial frequency characteristics of a density non-uniformity due to recording characteristics of the plurality of recording elements has a differential coefficient of substantially zero at a frequency origin point (f=0); and a correction processing unit which performs calculation for correcting the output density according to the density correction coefficients set by the correction coefficient setting unit.

11. An image forming apparatus comprising:

a recording head which has a plurality of recording elements;

an intermediate transfer medium on which an image is recorded temporarily by the recording head while the intermediate transfer medium implements relative movement with respect to the recording head;

an image defect determination device which is disposed on a downstream side of the recording head in terms of a direction of the relative movement of the intermediate transfer medium and which determines whether the image recorded on the intermediate transfer medium includes an image defect or not;

a transfer device which is disposed on a downstream side of the image defect determination device in terms of the direction of the relative movement of the intermediate transfer medium and which transfers the image recorded on the intermediate transfer medium, to a recording medium;

an ink cleaning device which is disposed on a downstream side of the transfer device and on an upstream side of the recording head in terms of the direction of the relative movement of the intermediate transfer medium and which removes ink deposited on the intermediate transfer medium by the recording head; and an image correction device which creates correction data according to information about the image defect if the image defect determination device determines that the image recorded on the intermediate transfer medium includes the image defect, wherein, if the image defect determination device determines that the image recorded on the intermediate transfer medium includes the image defect, then the transfer device is separated from the intermediate transfer medium, the ink deposited on the intermediate transfer medium by the recording head is removed by the ink cleaning device, and an image based on the correction data is recorded on the intermediate transfer medium by the recording head.

12. The image forming apparatus as defined in claim 11, wherein maintenance of the recording head is not carried out until printing according to a print instruction information received by the image forming apparatus is completed.

13. The image forming apparatus as defined in claim 11, wherein the image correction device comprises:

a correction range setting unit which selects N correction recording elements (where N is an integer which is 2 or more) used for correcting output density, from the plurality of recording elements;

a correction coefficient setting unit which sets density correction coefficients for the N correction recording elements according to correction conditions including a condition under which a power spectrum representing spatial frequency characteristics of a density non-uniformity due to recording characteristics of the plurality of recording elements has a differential coefficient of substantially zero at a frequency origin point (f=0); and a correction processing unit which performs calculation for correcting the output density according to the density correction coefficients set by the correction coefficient setting unit.

14. An image forming apparatus comprising:

a recording head which has a plurality of recording elements;

an intermediate transfer medium on which an image is recorded temporarily by the recording head while the intermediate transfer medium implements relative movement with respect to the recording head;

an image defect determination device which is disposed on a downstream side of the recording head in terms of a direction of the relative movement of the intermediate transfer medium and which determines whether the image recorded on the intermediate transfer medium includes an image defect or not;

an ink cleaning device which is disposed on a downstream side of the image defect determination device in terms of the direction of the relative movement of the intermediate transfer medium and which removes ink deposited on the intermediate transfer medium by the recording head;

a transfer device which is disposed on a downstream side of the ink cleaning device in terms of the direction of the relative movement of the intermediate transfer medium and which transfers the image recorded on the intermediate transfer medium, to a recording medium; and an image correction device which creates correction data according to information about the image defect if the image defect determination device determines that the image recorded on the intermediate transfer medium includes the image defect, wherein:

a test pattern image is recorded on the intermediate transfer medium by the recording head, the image defect determination device determines whether the test pattern image recorded on the intermediate transfer medium includes an image defect or not, and the ink cleaning device removes ink deposited on the intermediate transfer medium after the image defect determination device determines whether the test pattern image recorded on the intermediate transfer medium includes the image defect or not; and if the image defect determination device determines that the test pattern image recorded on the intermediate transfer medium includes the image defect, then the image correction device creates correction data according to information about the image defect included in the test pattern image and an image based on the correction data is recorded on the intermediate transfer medium by the recording head.

15. The image forming apparatus as defined in claim 14, wherein maintenance of the recording head is not carried out until printing according to a print instruction information received by the image forming apparatus is completed.

16. The image forming apparatus as defined in claim 14, wherein the image correction device comprises:

a correction range setting unit which selects N correction recording elements (where N is an integer which is 2 or more) used for correcting output density, from the plurality of recording elements;

a correction coefficient setting unit which sets density correction coefficients for the N correction recording elements according to correction conditions including a condition under which a power spectrum representing spatial frequency characteristics of a density non-uniformity due to recording characteristics of the plurality of recording elements has a differential coefficient of substantially zero at a frequency origin point (f=0); and a correction processing unit which performs calculation for correcting the output density according to the density correction coefficients set by the correction coefficient setting unit.

17. An image forming apparatus comprising:

a recording head which has a plurality of recording elements;

an intermediate transfer medium on which an image is recorded temporarily by the recording head while the intermediate transfer medium implements relative movement with respect to the recording head;

an image defect determination device which is disposed on a downstream side of the recording head in terms of a direction of the relative movement of the intermediate transfer medium and which determines whether the image recorded on the intermediate transfer medium includes an image defect or not;

a transfer device which is disposed on a downstream side of the image defect determination device in terms of the direction of the relative movement of the intermediate transfer medium and which transfers the image recorded on the intermediate transfer medium, to a recording medium;

an ink cleaning device which is disposed on a downstream side of the transfer device and on an upstream side of the recording head in terms of the direction of the relative movement of the intermediate transfer medium and which removes ink deposited on the intermediate transfer medium by the recording head; and an image correction device which creates correction data according to information about the image defect if the image defect determination device determines that the image recorded on the intermediate transfer medium includes the image defect, wherein:

a test pattern image is recorded on the intermediate transfer medium by the recording head, the image defect determination device determines whether the test pattern image recorded on the intermediate transfer medium includes an image defect or not, and the transfer device is separated from the intermediate transfer medium and the ink cleaning device removes ink deposited on the intermediate transfer medium after the image defect determination device determines whether the test pattern image recorded on the intermediate transfer medium includes the image defect or not; and if the image defect determination device determines that the test pattern image recorded on the intermediate transfer medium includes the image defect, then the image correction device creates correction data according to information about the image defect included in the test pattern image and an image based on the correction data is recorded on the intermediate transfer medium by the recording head.

18. The image forming apparatus as defined in claim 17, wherein maintenance of the recording head is not carried out until printing according to a print instruction information received by the image forming apparatus is completed.

19. The image forming apparatus as defined in claim 17, wherein the image correction device comprises:

a correction range setting unit which selects N correction recording elements (where N is an integer which is 2 or more) used for correcting output density, from the plurality of recording elements;

a correction coefficient setting unit which sets density correction coefficients for the N correction recording elements according to correction conditions including a condition under which a power spectrum representing spatial frequency characteristics of a density non-uniformity due to recording characteristics of the plurality of recording elements has a differential coefficient of substantially zero at a frequency origin point (f=0); and a correction processing unit which performs calculation for correcting the output density according to the density correction coefficients set by the correction coefficient setting unit.

* * * * *